US012099890B2

(12) United States Patent
Bixon et al.

(10) Patent No.: US 12,099,890 B2
(45) Date of Patent: Sep. 24, 2024

(54) INTERROGATION DEVICE AND/OR SYSTEM HAVING ALIGNMENT FEATURE(S) FOR WIRELESS TRANSPONDER TAGGED SPECIMEN CONTAINERS AND/OR CARRIERS

(71) Applicant: TMRW LIFE SCIENCES, INC., New York, NY (US)

(72) Inventors: Brian Joseph Bixon, Jersey City, NJ (US); Alan Murray, New York, NY (US); Chengxi Li, Jersey City, NJ (US)

(73) Assignee: TMRW Life Sciences, Inc., New York, NY (US)

(*) Notice: Subject to any disclaimer, the term of this patent is extended or adjusted under 35 U.S.C. 154(b) by 68 days.

(21) Appl. No.: 17/490,274

(22) Filed: Sep. 30, 2021

(65) Prior Publication Data

US 2022/0108146 A1    Apr. 7, 2022

Related U.S. Application Data

(60) Provisional application No. 63/109,533, filed on Nov. 4, 2020, provisional application No. 63/087,000, filed on Oct. 2, 2020.

(51) Int. Cl.
*G06K 19/077* (2006.01)
*G01N 1/42* (2006.01)
*G06K 19/07* (2006.01)

(52) U.S. Cl.
CPC ......... *G06K 19/07773* (2013.01); *G01N 1/42* (2013.01); *G06K 19/0723* (2013.01)

(58) Field of Classification Search
CPC ......... G06K 19/07773; G06K 19/0723; G06K 7/10316; G06K 7/10336; G06K 7/0004;
(Continued)

(56) References Cited

U.S. PATENT DOCUMENTS 5,024,830 A  6/1991 Linner
5,176,202 A  1/1993 Richard
(Continued)

FOREIGN PATENT DOCUMENTS

AU  2011357590 B2  9/2015
AU  2017287017 A1  1/2019
(Continued)

OTHER PUBLICATIONS

International Search Report and Written Opinion for PCT/US2022/077741, mailed date Feb. 1, 2023, 12 pages.
(Continued)

*Primary Examiner* — Sonji N Johnson
*Assistant Examiner* — Tae W Kim
(74) *Attorney, Agent, or Firm* — Cozen O'Connor

(57) ABSTRACT

An interrogation device and/or system includes a body and an antenna, the body has an aperture or elongated receiver with an opening and an internal perimeter or inner wall sized and/or shaped to receive a portion of a container therein, either with or without a cap of the container. The container may, for example, be used to store biological specimens a cryogenic temperatures. One or more alignment features of the body align wireless transponders (e.g., RFID transponders) of tagged specimen containers and/or carriers with the antenna to enhance interrogation. Alignment may be along a longitudinal or Z-axis, and/or alignment in an XY plane, perpendicular to the Z-axis. Shielding may reduce or even eliminate cross-talk with neighboring wireless tagged specimen containers and/or carriers.

12 Claims, 12 Drawing Sheets

(58) Field of Classification Search
CPC ... G06K 7/10386; G06K 7/10881; G01N 1/42
USPC .......................................................... 235/492
See application file for complete search history.

(56) References Cited

U.S. PATENT DOCUMENTS

| | | |
|---|---|---|
| 5,355,684 A | 10/1994 | Guice |
| 5,741,462 A | 4/1998 | Nova et al. |
| 5,751,629 A | 5/1998 | Nova et al. |
| 5,874,214 A | 2/1999 | Nova et al. |
| 5,921,102 A | 7/1999 | Vago |
| 5,925,562 A | 7/1999 | Nova et al. |
| 5,964,095 A | 10/1999 | Coelho et al. |
| 6,100,026 A | 8/2000 | Nova et al. |
| 6,141,975 A | 11/2000 | Tatsumi |
| 6,156,566 A | 12/2000 | Bryant |
| 6,302,327 B1 | 10/2001 | Coelho et al. |
| 6,329,139 B1 | 12/2001 | Nova et al. |
| 6,564,120 B1 | 5/2003 | Richard et al. |
| 6,888,063 B1 | 5/2005 | Lien et al. |
| 7,070,053 B1 | 7/2006 | Abrams et al. |
| 7,091,864 B2 | 8/2006 | Veitch et al. |
| 7,278,328 B2 | 10/2007 | Massaro |
| 7,350,703 B2 | 4/2008 | Ambartsoumian |
| 7,411,508 B2 | 8/2008 | Harazin et al. |
| 7,661,591 B2 | 2/2010 | Dearing et al. |
| 7,861,540 B2 | 1/2011 | Cloutier et al. |
| 7,870,748 B2 | 1/2011 | Byrne |
| 8,097,199 B2 | 1/2012 | Abbott et al. |
| 8,098,162 B2 | 1/2012 | Abbott et al. |
| 8,115,599 B2 | 2/2012 | Harazin et al. |
| 8,378,827 B2 | 2/2013 | Davidowitz et al. |
| 8,502,645 B2 | 8/2013 | Thomas et al. |
| 8,710,958 B2 | 4/2014 | Yang et al. |
| 8,852,536 B2 | 10/2014 | Davidowitz et al. |
| 8,872,627 B2 | 10/2014 | Davidowitz |
| 8,884,743 B2 | 11/2014 | Chaffey et al. |
| 8,919,532 B2 | 12/2014 | Buergermeister et al. |
| 8,937,550 B2 | 1/2015 | Phaneuf et al. |
| 9,163,869 B2 | 10/2015 | Warhurst et al. |
| 9,211,540 B2 | 12/2015 | Lansdowne |
| 9,289,770 B2 | 3/2016 | Lavi |
| 9,418,265 B2 | 8/2016 | Morris et al. |
| 9,431,692 B2 | 8/2016 | Davidowitz et al. |
| 9,501,734 B2 | 11/2016 | Morris |
| 9,516,876 B2 | 12/2016 | Inoue |
| 9,547,782 B2 | 1/2017 | Lansdowne |
| 9,589,225 B2 | 3/2017 | Morris |
| 9,619,678 B2 | 4/2017 | Morris et al. |
| 9,697,457 B2 | 7/2017 | Morris |
| 9,736,890 B2 | 8/2017 | Chaffey et al. |
| 9,764,325 B2 | 9/2017 | Davidowitz |
| 9,928,457 B2 | 3/2018 | McDowell |
| 10,156,386 B2 | 12/2018 | Bartlett et al. |
| 10,207,270 B2 | 2/2019 | Lansdowne |
| 10,241,015 B2 | 3/2019 | Hollabaugh et al. |
| 10,328,431 B2 | 6/2019 | Davidowitz |
| 10,401,082 B2 | 9/2019 | Coradetti et al. |
| 10,561,141 B2 | 2/2020 | Suzuki et al. |
| 10,973,226 B2 | 4/2021 | Blair et al. |
| 2002/0190845 A1 | 12/2002 | Moore |
| 2002/0196146 A1 | 12/2002 | Moore |
| 2003/0174046 A1 | 9/2003 | Abrams |
| 2004/0100415 A1 | 5/2004 | Veitch et al. |
| 2005/0058483 A1* | 3/2005 | Chapman .................. G06K 5/02 400/76 |
| 2005/0237195 A1 | 10/2005 | Urban |
| 2005/0247782 A1 | 11/2005 | Ambartsoumian |
| 2006/0051239 A1 | 3/2006 | Massaro |
| 2006/0283945 A1* | 12/2006 | Excoffier .............. B01L 3/5457 235/487 |
| 2007/0068208 A1 | 3/2007 | Norman et al. |
| 2007/0172396 A1 | 7/2007 | Neeper et al. |
| 2008/0012687 A1 | 1/2008 | Rubinstein |
| 2008/0024301 A1 | 1/2008 | Fritchie et al. |
| 2008/0121700 A1 | 5/2008 | Dearing et al. |
| 2008/0239478 A1 | 10/2008 | Tafas et al. |
| 2009/0015430 A1 | 1/2009 | Harazin et al. |
| 2009/0026907 A1 | 1/2009 | Davidowitz et al. |
| 2009/0188272 A1 | 7/2009 | Cloutier et al. |
| 2009/0318751 A1 | 12/2009 | Lansdowne |
| 2009/0322486 A1 | 12/2009 | Gerstel |
| 2010/0028214 A1 | 2/2010 | Howard et al. |
| 2010/0123551 A1 | 5/2010 | Fritchie |
| 2010/0281886 A1 | 11/2010 | Shaham et al. |
| 2010/0302040 A1 | 12/2010 | Davidowitz et al. |
| 2010/0318217 A1 | 12/2010 | Ferrer et al. |
| 2011/0088424 A1 | 4/2011 | Cloutier et al. |
| 2011/0088517 A1 | 4/2011 | Tsujimura et al. |
| 2011/0137812 A1 | 6/2011 | Sherga |
| 2011/0143452 A1 | 6/2011 | Che et al. |
| 2011/0181875 A1 | 7/2011 | Nakahana et al. |
| 2011/0199187 A1 | 8/2011 | Davidowitz |
| 2011/0199188 A1 | 8/2011 | Dickson |
| 2011/0308271 A1 | 12/2011 | Schryver |
| 2011/0312102 A1 | 12/2011 | Jo |
| 2012/0060514 A1 | 3/2012 | Warhurst et al. |
| 2012/0060520 A1 | 3/2012 | Collins et al. |
| 2012/0060539 A1 | 3/2012 | Hunt et al. |
| 2012/0060541 A1 | 3/2012 | Hunt et al. |
| 2012/0064603 A1 | 3/2012 | Childs et al. |
| 2012/0256806 A1* | 10/2012 | Davidowitz .......... G01S 13/751 374/E13.001 |
| 2012/0272500 A1 | 11/2012 | Reuteler |
| 2012/0293338 A1 | 11/2012 | Chaffey et al. |
| 2013/0011226 A1 | 1/2013 | Camenisch et al. |
| 2013/0048711 A1 | 2/2013 | Burns et al. |
| 2013/0076215 A1 | 3/2013 | Davidowitz et al. |
| 2013/0106579 A1 | 5/2013 | Aubert et al. |
| 2013/0119562 A1 | 5/2013 | Shimizu et al. |
| 2013/0151004 A1 | 6/2013 | Winter et al. |
| 2013/0152710 A1 | 6/2013 | Laugharn et al. |
| 2013/0217107 A1 | 8/2013 | Pederson et al. |
| 2013/0342320 A1* | 12/2013 | Hinman ........... G06K 19/07327 340/10.1 |
| 2014/0008355 A1 | 1/2014 | Chaffey et al. |
| 2014/0157798 A1 | 6/2014 | Jimenez-Rios et al. |
| 2014/0171829 A1 | 6/2014 | Holmes et al. |
| 2014/0230472 A1 | 8/2014 | Coradetti et al. |
| 2014/0352456 A1 | 12/2014 | Davidowitz |
| 2015/0045782 A1 | 2/2015 | Ottanelli |
| 2015/0084771 A1 | 3/2015 | Nikitin et al. |
| 2015/0122887 A1 | 5/2015 | Morris et al. |
| 2015/0125574 A1 | 5/2015 | Arent et al. |
| 2015/0153369 A1 | 6/2015 | Giovanoli |
| 2015/0204598 A1 | 7/2015 | Affleck et al. |
| 2015/0205986 A1 | 7/2015 | Morris et al. |
| 2015/0273468 A1 | 10/2015 | Croquette et al. |
| 2015/0356398 A1 | 12/2015 | Morris |
| 2015/0379390 A1 | 12/2015 | Morris |
| 2016/0026911 A1 | 1/2016 | Morris et al. |
| 2016/0063287 A1 | 3/2016 | Birrer et al. |
| 2016/0085913 A1 | 3/2016 | Evans et al. |
| 2016/0086003 A1 | 3/2016 | Nikitin |
| 2016/0095309 A1 | 4/2016 | Reuteler |
| 2016/0143270 A1 | 5/2016 | Schryver |
| 2016/0175837 A1 | 6/2016 | Chaffey et al. |
| 2016/0288999 A1 | 10/2016 | Caveney et al. |
| 2016/0289000 A1 | 10/2016 | Caveney et al. |
| 2016/0349172 A1 | 12/2016 | Houghton et al. |
| 2016/0353730 A1 | 12/2016 | Harston et al. |
| 2016/0358062 A1 | 12/2016 | Morris |
| 2017/0113909 A1 | 4/2017 | Frey et al. |
| 2017/0122846 A1 | 5/2017 | Holmes et al. |
| 2017/0184479 A1 | 6/2017 | Schryver et al. |
| 2017/0190056 A1 | 7/2017 | Lapham et al. |
| 2017/0320054 A1 | 11/2017 | Crum et al. |
| 2018/0020659 A1 | 1/2018 | Camenisch et al. |
| 2018/0043364 A1 | 2/2018 | Davidowitz |
| 2018/0055042 A1 | 3/2018 | Sarmentero Ortiz |
| 2018/0100868 A1 | 4/2018 | Grimwood et al. |
| 2018/0128210 A1 | 5/2018 | Garner |
| 2018/0135806 A1 | 5/2018 | Qu et al. |
| 2018/0137315 A1 | 5/2018 | Johns et al. |

(56) References Cited

U.S. PATENT DOCUMENTS

| | | |
|---|---|---|
| 2018/0202908 A1 | 7/2018 | Croquette et al. |
| 2018/0313498 A1 | 11/2018 | Antola et al. |
| 2018/0368394 A1 | 12/2018 | Kjelland et al. |
| 2019/0000073 A1 | 1/2019 | Pedersen et al. |
| 2019/0025280 A1 | 1/2019 | Kaditz et al. |
| 2019/0060892 A1 | 2/2019 | Davidowitz et al. |
| 2019/0162639 A1 | 5/2019 | Gutelius et al. |
| 2019/0193078 A1 | 6/2019 | Fiondella et al. |
| 2019/0250181 A1 | 8/2019 | Seeber |
| 2019/0276233 A1 | 9/2019 | Caveney et al. |
| 2019/0293344 A1 | 9/2019 | Sun et al. |
| 2019/0297877 A1 | 10/2019 | Komatsu et al. |
| 2020/0097788 A1 | 3/2020 | Pedersen et al. |
| 2020/0107541 A1* | 4/2020 | Blair .................... B01L 3/5082 |
| 2020/0143930 A1 | 5/2020 | Catchings et al. |
| 2020/0248638 A1 | 8/2020 | Engfehr et al. |
| 2020/0319625 A1 | 10/2020 | Morris et al. |
| 2021/0039937 A1 | 2/2021 | Tansey et al. |
| 2021/0121876 A1 | 4/2021 | Blair et al. |
| 2021/0135061 A1 | 5/2021 | Navabi |
| 2021/0244018 A1 | 8/2021 | Sandy et al. |
| 2022/0087253 A1 | 3/2022 | Gupta et al. |
| 2022/0136656 A1 | 5/2022 | Clarke et al. |
| 2023/0329230 A1 | 10/2023 | Li et al. |

FOREIGN PATENT DOCUMENTS

| | | |
|---|---|---|
| CA | 2972315 A1 | 8/2016 |
| CN | 105857932 A | 8/2016 |
| CN | 105890965 A | 8/2016 |
| CN | 106102460 A | 11/2016 |
| CN | 205815766 U | 12/2016 |
| CN | 106370879 A | 2/2017 |
| CN | 106871546 A | 6/2017 |
| CN | 107624751 A | 1/2018 |
| CN | 207595583 U | 7/2018 |
| CN | 207663251 U | 7/2018 |
| CN | 207675193 U | 7/2018 |
| CN | 109258627 A | 1/2019 |
| CN | 208425434 U | 1/2019 |
| CN | 109922887 A | 6/2019 |
| CN | 110517737 A | 11/2019 |
| CN | 110550327 A | 12/2019 |
| CN | 110583618 A | 12/2019 |
| CN | 110589332 A | 12/2019 |
| CN | 110645752 A | 1/2020 |
| CN | 110667986 A | 1/2020 |
| CN | 210614415 U | 5/2020 |
| CN | 210709605 U | 6/2020 |
| CN | 210709624 U | 6/2020 |
| CN | 112090469 A | 12/2020 |
| CN | 112189657 A | 1/2021 |
| CN | 112325976 A | 2/2021 |
| CN | 112325978 A | 2/2021 |
| CN | 112340334 A | 2/2021 |
| CN | 112841172 A | 5/2021 |
| CN | 213274464 U | 5/2021 |
| CN | 112894791 A | 6/2021 |
| CN | 213863260 U | 8/2021 |
| CN | 213863569 U | 8/2021 |
| CN | 213872207 U | 8/2021 |
| CN | 213874569 U | 8/2021 |
| CN | 213995979 U | 8/2021 |
| CN | 214006820 U | 8/2021 |
| CN | 214216855 U | 9/2021 |
| CN | 214358041 U | 10/2021 |
| CN | 214398091 U | 10/2021 |
| CN | 214758843 U | 11/2021 |
| CN | 115352743 A | 11/2022 |
| CN | 219596677 U | 8/2023 |
| DE | 102011012887 A1 | 8/2012 |
| EP | 0411224 A2 | 2/1991 |
| EP | 0706825 A1 | 4/1996 |
| EP | 0811140 A1 | 12/1997 |
| EP | 1002211 A2 | 5/2000 |
| EP | 1366998 A3 | 3/2004 |
| EP | 1366998 B1 | 1/2006 |
| EP | 1916492 A1 | 4/2008 |
| EP | 2315163 A1 | 4/2011 |
| EP | 2358196 A1 | 8/2011 |
| EP | 2124171 B1 | 8/2012 |
| EP | 2666694 B1 | 7/2014 |
| EP | 1888239 B1 | 10/2014 |
| EP | 1981692 B1 | 6/2015 |
| EP | 2498968 B1 | 9/2015 |
| EP | 2335182 B1 | 10/2015 |
| EP | 2297736 B1 | 2/2016 |
| EP | 2292332 B1 | 7/2016 |
| EP | 2765183 B1 | 7/2016 |
| EP | 2354729 B1 | 12/2016 |
| EP | 2873497 B1 | 5/2017 |
| EP | 2948247 B1 | 11/2017 |
| EP | 2743865 B1 | 6/2019 |
| EP | 2866938 B1 | 6/2019 |
| EP | 2232175 B1 | 8/2019 |
| EP | 3539899 A1 | 9/2019 |
| EP | 2965266 B1 | 10/2019 |
| EP | 2492663 B1 | 12/2019 |
| EP | 3228191 B1 | 8/2020 |
| ES | 2595984 T3 | 1/2017 |
| JP | 2004028595 A | 1/2004 |
| JP | 2005009863 A | 1/2005 |
| JP | 2005239366 A | 9/2005 |
| JP | 2007235905 A | 9/2007 |
| JP | 2007532867 A | 11/2007 |
| JP | 2010521725 A | 6/2010 |
| JP | 5278978 B2 | 5/2013 |
| JP | 2015019244 A | 1/2015 |
| JP | 2015087306 A | 5/2015 |
| JP | 2017508984 A | 3/2017 |
| JP | 2017514499 A | 6/2017 |
| JP | 6343934 B2 | 6/2018 |
| JP | 2018136246 A | 8/2018 |
| JP | 2019518974 A | 7/2019 |
| JP | 2019529938 A | 10/2019 |
| JP | 2019536973 A | 12/2019 |
| KR | 20080070015 A | 7/2008 |
| KR | 102368093 B1 | 2/2022 |
| WO | 9216800 A1 | 10/1992 |
| WO | 0105687 A1 | 1/2001 |
| WO | 0194016 A1 | 12/2001 |
| WO | 02081743 A2 | 10/2002 |
| WO | 03061381 A1 | 7/2003 |
| WO | 2004026661 A1 | 4/2004 |
| WO | 2005093641 A1 | 10/2005 |
| WO | 2005109332 A1 | 11/2005 |
| WO | 2005115621 A1 | 12/2005 |
| WO | 2006029110 A1 | 3/2006 |
| WO | 2007024540 A1 | 3/2007 |
| WO | 2007049039 A1 | 5/2007 |
| WO | 2007075253 A2 | 7/2007 |
| WO | 2007092119 A1 | 8/2007 |
| WO | 2008024471 A2 | 2/2008 |
| WO | 2008057150 A1 | 5/2008 |
| WO | 2009004366 A1 | 1/2009 |
| WO | 2009017558 A1 | 2/2009 |
| WO | 2009094071 A3 | 10/2009 |
| WO | 2009120596 A1 | 10/2009 |
| WO | 2009155638 A1 | 12/2009 |
| WO | 2010037166 A1 | 4/2010 |
| WO | 2011069190 A1 | 6/2011 |
| WO | 2012083396 A1 | 6/2012 |
| WO | 2012100281 A1 | 8/2012 |
| WO | 2012033605 A3 | 11/2012 |
| WO | 2012033994 A3 | 12/2012 |
| WO | 2012033992 A3 | 4/2013 |
| WO | 2013053011 A1 | 4/2013 |
| WO | 2010014656 A3 | 5/2013 |
| WO | 2012034037 A3 | 5/2013 |
| WO | 2014001819 A1 | 1/2014 |
| WO | 2014006417 A1 | 1/2014 |
| WO | 2014009729 A1 | 1/2014 |
| WO | 2014114938 A2 | 7/2014 |
| WO | 2014157798 A1 | 10/2014 |

(56) References Cited

FOREIGN PATENT DOCUMENTS

| | | |
|---|---|---|
| WO | 2014191757 A1 | 12/2014 |
| WO | 2015073964 A1 | 5/2015 |
| WO | 2015109315 A3 | 10/2015 |
| WO | 2016120224 A1 | 8/2016 |
| WO | 2016160984 A1 | 10/2016 |
| WO | 2016160986 A3 | 11/2016 |
| WO | 2016200519 A1 | 12/2016 |
| WO | 2017014999 A1 | 1/2017 |
| WO | 2017075144 A1 | 5/2017 |
| WO | 2017109153 A1 | 6/2017 |
| WO | 2017215957 A1 | 12/2017 |
| WO | 2018000051 A1 | 1/2018 |
| WO | 2018002287 A1 | 1/2018 |
| WO | 2018005129 A1 | 1/2018 |
| WO | 2018025053 A1 | 2/2018 |
| WO | 2018039727 A1 | 3/2018 |
| WO | 2018041516 A1 | 3/2018 |
| WO | 2018097267 A1 | 5/2018 |
| WO | 2018215588 A1 | 11/2018 |
| WO | 2019005450 A1 | 1/2019 |
| WO | 2019182900 A1 | 9/2019 |
| WO | 2020033578 A1 | 2/2020 |

OTHER PUBLICATIONS

International Search Report and Written Opinion of the International Searching Authority, mailed Jan. 12, 2022, for International Application No. PCT/US2021/051803, 8 pages.
International Search Report and Written Opinion of the International Searching Authority, mailed Jan. 24, 2022, for International Application No. PCT/US2021/052896, 10 pages.
Fontaine, "Automated Visual Tracking for Behavioral Analysis of Biological Model Organisms," Dissertation (Ph.D.), California Institute of Technology, ProQuest Dissertations Publishing (2008), 156 pages.
Notice of Allowance for U.S. Appl. No. 17/321,174, mailed Jul. 12, 2023, 13 pages.
International Search Report and Written Opinion for PCT/US2022/012151, mailed Apr. 29, 2022, 9 pages.
International Search Report and Written Opinion for PCT/US2022/028185, mailed Aug. 26, 2022, 11 pages.
"S840 Lab Mover", Large Volume LNS Dry Vapor Shipper, Products Shipping, Jul. 6, Abeyance Cry Solutions—Abeyateck, LLC, 2021, 3 pages.
"Simple, Secure—190°C LN2 Vapor Storage", Products Shipping, Jul. 6, Abeyance Cry Solutions—Abeyateck, LLC, 2021, 7 pages.
International Search Report for PCT/US2021/032600, mailed Sep. 3, 2021, 4 pages.
Japanese Office Action for Japanese Patent Application No. 2022-525678, mailed May 29, 2023 (with English Translation) 12 pages.
Japanese Office Action, dated Jun. 6, 2023, for corresponding Japanese Application No. 2022-525679, 16 pages.
"Abeyance Web App / Stay Connected", Jul. 6, Abeyance Cry Solutions—Abeyateck, LLC, 2021, 3 pages.
"IVF Witness System: RI Witness TM ART Management System", Confidence, Efficiency and Trust, IVF Witness System—RI Witness—CooperSurgical Fertility Companies https//fertility.coopersurgical.com/equipment/ri-witness—Apr. 19, 2021, 28 pages.
"IVF Witness System: RI Witness TM ART Management System", CooperSurgical Fertility Company 2021, 24 pages.
"RI Witness—Confidence, Efficiency and Trust", CooperSurgical, Fertility and Genomic Solutions, Order No. WIT_BRO_001_V13_ROW—Oct. 13, 2020, 13 pages.
"RI Witness—Product guide", CooperSurgical Fertility and Genomic Solutions, Order No. EQU_BRO_004, V1: Row Oct. 24, 2018, 12 pages.
Brady printer Range, "Everyone is Unique" Continual cryopreservation monitoring from RI Witness, CooperSurgical, Inc. Order No. WIT_FLY_010_V2_US Oct. 14, 2020, 3 pages.
Comley, J., "New approaches to sample identification tracking and technologies for maintaining the quality of stored samples," Drug Discovery World Summer 2017, 11 pages.
CooperSurgical, RI Witness, Order No. CE 60010312 Version 3-ROW: Oct. 24, 2018, 12 pages.
FluidX Tri-Coded Jacket: 0.7ml Sample Storage Tube with External Thread; Brooks Life Sciences; https://bioinventory.biostorage.com.
HID Beyond Cool: RFID disentangles cryopreservation storage and management, 2015, 4 pages.
Ihmig et al., "Frozen cells and bits," IEEE Pulse, Sep. 2013, 9 pages.
International Preliminary Report on Patentability and Written Opinion from PCT Application No. PCT/GB2005/002048 dated Aug. 23, 2005, 9 pages.
International Search Report and Written Opinion for International Application No. PCT/US2020/057779, Mailed on Jun. 17, 2021, 12 pages.
International Search Report and Written Opinion for PCT/US2020/057764, Mailed Date: Feb. 19, 2021, 14 pages.
International Search Report and Written Opinion for PCT/US2020/060565, mailed Mar. 8, 2021, 11 pages.
Office Action dated Sep. 3, 2020, for U.S. Appl. No. 16/840,718, 46 pages.
Maggiulli, Roberta , et al., "Implementing an electronic witnessing system into a busy IVF clinic—one clinic's experience", Genera Center for Reproductive Medicine, Rome, Italy, 2 pages.
Rienzi, Laura , et al., Poster Witness "Electronic Witness System makes patients less concerned about biological sample mix-up errors and comfortable with IOVF clinical practice", Genera Center for Reproductive Medicine, Via de Notaris 2b, 00197, Rome, Italy. 2015, 1 page.
Swedberg, Claire , "Hitachi Chemical Markets Tiny UHF Tag", https://www.rfidjournal.com/hitachi-chemical-markets-tiny-uhf-tag, Sep. 12, 2010, 4 pages.
Thornhill, A. R, et al., Measuring human error in the IVF laboratory using an electronic witnessing system, Monduzzi Editoriale, Proceedings, 17th World Congress on Controversies in Obstetrics, Genecology & Infertility (GOGI), Nov. 8-11, 2012 Lisbon, Portugal, 6 pages.
Non Final Office Action for U.S. Appl. No. 17/083,179, mailed Sep. 1, 2022, 8 pages.
Non Final Office Action for U.S. Appl. No. 17/321,174, mailed Nov. 22, 2022, 26 pages.
EP Search Report mailed Nov. 7, 2023, in EP App No. 21808453.1, Nov. 11, 2023.
Japanese Office Action for Japanese Patent Application No. 2022-525678, mailed Oct. 12, 2023 (with English Translation) 12 pages.
Japanese Office Action for JP 2022-569516, mailed Nov. 8, 2023, 6 pages {with English Translation).
Australian Examination Report mailed Feb. 26, 2024, Application No. 2021348066, 8 pages.
Australian Examination Report mailed Mar. 28, 2024, Application No. 2022207973, 4 pages.
Japanese Office Action, dated Mar. 26, 2024, for corresponding Japanese Application No. 2023-519519, 15 pages.
Non-Final Office Action Issued in U.S. Appl. No. 18/113,297, mailed May 14, 2024, 41 pages.
Notice of Reasons for Refusal. Japanese Application No. 2023-541871, dated Apr. 24, 2024, 3 pages.

* cited by examiner

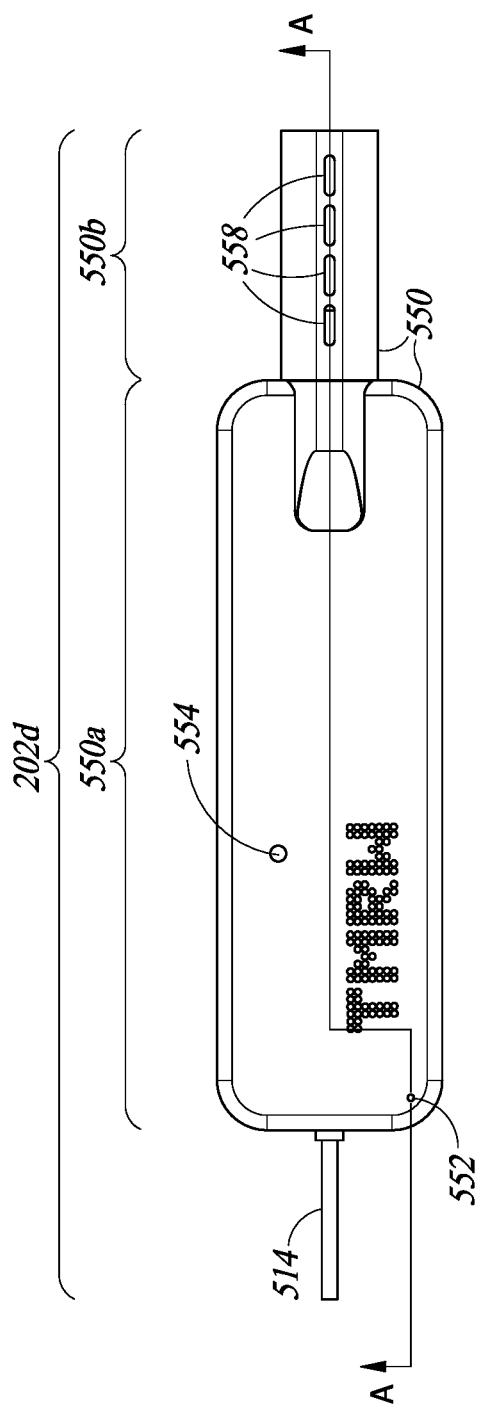
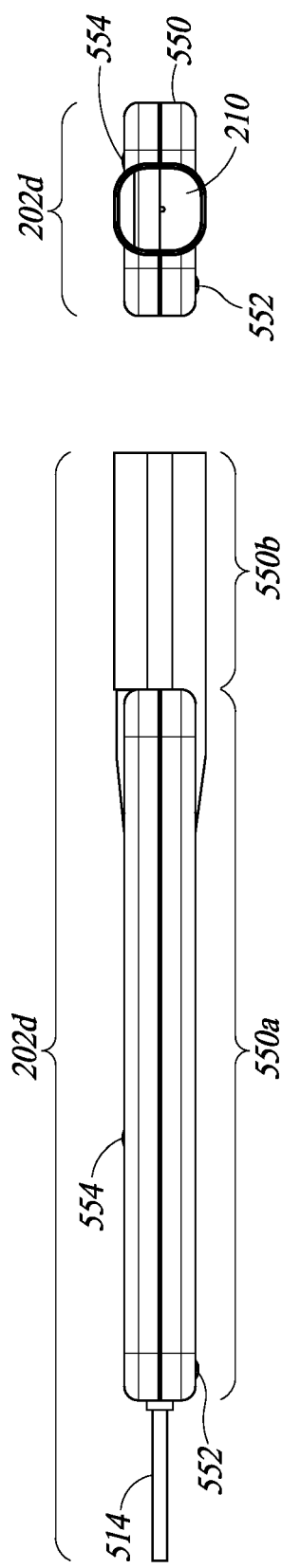
FIG. 5D
FIG. 5E
FIG. 5F

INTERROGATION DEVICE AND/OR SYSTEM HAVING ALIGNMENT FEATURE(S) FOR WIRELESS TRANSPONDER TAGGED SPECIMEN CONTAINERS AND/OR CARRIERS

TECHNICAL FIELD

The present disclosure relates generally to wireless interrogation of specimen containers and/or specimen carriers that are tagged with wireless transponders, for instance radio frequency identification (RFID) transponders, and in particular to a system that includes a tool with alignment features that allow alignment of an interrogation antenna with respect to a specimen container to enhance interrogation or reading of the wireless transponder(s) carried by the specimen container.

BACKGROUND

Description of the Related Art

Long-term preservation of cells and tissues through cryopreservation has broad impacts in multiple fields including tissue engineering, fertility and reproductive medicine, regenerative medicine, stem cells, blood banking, animal strain preservation, clinical sample storage, transplantation medicine, and in vitro drug testing. This can include the process of vitrification in which a biological sample (e.g., an oocyte, an embryo, a biopsy) contained in or on a specimen holder is rapidly cooled by placing the biological sample and the specimen holder in a substance, such as liquid nitrogen. This results in a glass-like solidification or glassy state of the biological sample (e.g., a glass structure at the molecular level), which maintains the absence of intracellular and extracellular ice (e.g., reducing cell damage and/or death) and, upon thawing, improves post-thaw cell viability. To ensure viability, the vitrified biological samples are then typically continuously stored in a liquid nitrogen dewar or other container, which is at a temperature conducive to cryopreservation, for example negative 196 degrees Celsius.

BRIEF SUMMARY

The specimen holder may, for example, take the form of a cryopreservation straw, cryopreservation tube, cryopreservation stick or cryopreservation spatula. The specimen holders are typically placed in a specimen container. The specimen container typically comprises a vial and a cap, the cap selectively removable from the vial to access an interior of the vial. In some instances, two or more specimen holders may be placed in a single specimen container. In other instances, as described in Applicant's own patent applications, a specimen holder may be attached or fixed to the cap. The cap may be removably attached to the vial, for example, via mating threads or a snap fit. As also described in Applicant's own patent applications, the specimen containers and/or even the specimen holder(s) can include identification information, for instance in the form of one or more of: direct markings or indicia made on the specimen containers or specimen holders; one or more labels (e.g., labels bearing printed or hand written indicia); one or more machine-readable symbols (e.g., one-dimensional or barcode symbols; two-dimensional code symbols) and/or one or more wireless transponders (e.g., radio frequency identification (RFID) transponders). While denominated as radio frequency identification, it is noted that RFID typically encompasses wireless transmission in the radio frequency and microwave frequency portions of the electromagnetic spectrum. Hence, references herein to radio or radio frequency are not intended to be limited to the radio frequency range of the electromagnetic spectrum unless clearly indicated otherwise, and typically are mean to also include the microwave frequency portion of the electromagnetic spectrum.

The ability to accurately identify, manage, inventory, store, and/or retrieve biological specimens is typically considered an objective of any system or facility (e.g., in vitro fertilization (IVF) facility). Vitrification can be damage direct markings or indicia, labels, and/or machine readable symbols. In any case, wireless interrogation of wireless transponders may be preferred as a more fully automated approach to identification.

The specimen containers in many implementations will be closely spaced with respect to one another, for instance to minimize the amount of storage spaced required and/or to maximize the number of specimens that may be stored in a given volume of space (e.g., stored in a volume of a cryogenic dewar). For example, a plurality of specimen containers may be arrayed in a carrier, holder or shelf, spaced within a few centimeters of one another. Additionally or alternatively, specimen holders may be closely spaced in a specimen container, for example two or more specimen holders for a given patient may be stored in the same specimen container. A storage space may contain a plurality of these carriers, holders or shelves, for example arrayed about a central axis, and at two or more levels along the central axis. The close spacing may cause difficulties during interrogation of wireless transponders, whether carried by the specimen containers and/or by the specimen holders. For example, the close spacing, particularly when carried or otherwise attached or fixed to the specimen holders, may cause cross-talk or other interference in interrogation signals emitted by an interrogator or interrogation system and response signals returned from wireless transponders. While anti-collision and/or polling approaches to interrogation exist, these tend to significantly increase time required to identify the various wireless transponder in a range of the interrogator or interrogation system. Conversely, it is typically highly desirable to minimize an amount of time that specimens are subject to higher than cryogenic temperatures. Also for example, it may be difficult or even impossible to associate (e.g., visually associate, logically associate, draw a correspondence between an identifier and a physical object such as a specimen container) a response signal with a given one of the specimen containers or specimen holders.

Various systems, devices and methods are described herein that advantageously address the various issues presented with automatic identification of specimen holders and/or specimen containers identified using interrogation of wireless transponders physically associated with the specimen holders and/or specimen containers.

A system to read information from wireless transponders carried by or in tubular specimen containers may be summarized as including: a body having a proximate end, a distal end, and an aperture at the distal end, the aperture having an opening at an outermost portion thereof, and a stop located inwardly from an outermost opening of the aperture; the aperture including structure sized to receive a portion of a tubular specimen container therein, and the stop sized and positioned to limit a distance that the tubular specimen container may be inserted into the aperture; and an interrogation antenna carried by a portion of the body, the interrogation antenna positioned to communicatively couple with a wireless transponder carried by the tubular specimen container at least when the tubular specimen container is positioned in the aperture.

The system may further include an interrogation circuit communicatively coupled to the interrogation antenna. The interrogation circuit is housed by the body. Alternatively, the interrogation circuit may housed separately from the body; and may further include a cable that communicatively couples the interrogation circuit with the interrogation antenna. Alternatively, the interrogation circuit may be housed separately from the body; and may further include a radio housed by the wand that communicatively couples the interrogation circuit with the interrogation antenna.

The body may take any of a variety of forms, each with its own advantages. For example, the body may take the form of a hand-held wand, having an elongated shape, with a handle at or proximate the proximate end thereof. The handle may be shaped and dimensioned to be graspable by a human hand. The body may be pistol shaped, having an included angle between the distal end and the proximate end, for instance an obtuse angle. A handle at the proximate end may be shaped and dimensioned to be graspable by a human hand. Also for example, the body may take the form of an end of arm tool or end effector, that is attached or is attachable to an appendage of a robot. The end of arm tool or end effector may have a coupler at a proximate end thereof to allow detachable coupling to the appendage of the robot.

The structure of the aperture of the body may comprise an inner wall with a profile that matches a profile of an outer portion of the tubular specimen container. Alternatively, the structure of the aperture may comprise a plurality of ribs or standoffs with a profile that matches a profile of an outer portion of the tubular specimen container. The tubular specimen container may include a vial and a cap that is selectively removable from the vial, and the inner wall of the aperture may have a profile that matches a profile of an outer portion of the cap. Alternatively, the structure of the inner wall of the aperture may have a profile that matches a profile of an outer portion of the vial with the cap removed.

The structure of the inner wall of the aperture may have a profile that has at least one dimension that is sized with respect to a corresponding at least one dimension of an outer portion of the tubular specimen container such that the outer portion of the tubular specimen container contacts the structure of the inner wall of the aperture around an entirety of the profile of the structure of the inner wall while permitting at least one of sliding or rotation therebetween. The structure of the inner wall of the aperture may have a profile that has at least one dimension that is sized with respect to a corresponding at least one dimension of an outer portion of the tubular specimen container to provide a clearance fit therebetween. The structure of the inner wall of the aperture may have a profile that has at least one dimension that is less than ¼ inch larger than a corresponding at least one dimension of an outer portion of the tubular specimen container. The structure of the inner wall of the aperture may have a profile that has at least one dimension that is less than ¼ inch larger than a corresponding at least one dimension of a profile of an outer portion of the cap. The structure of the inner wall of the aperture may have a profile that that has at least one dimension that is less than ¼ inch larger than a corresponding at least one dimension of a profile of an outer portion of the vial with the cap removed.

The interrogation antenna may encompass at least a portion of an interior of the aperture. The interrogation antenna may comprises one or more loops and may lie in a plane that is perpendicular to a longitudinal axis of the aperture. The interrogation antenna may be positioned in front of the stop of the aperture and radially spaced from the wireless transponder by a distance that is an integer multiple of a ¼ wavelength of the wireless transponder when the tubular specimen container is positioned in the aperture with a top end thereof positioned against the stop.

The interrogation antenna may be positioned behind the stop of the aperture. The interrogation antenna may be longitudinally spaced from the wireless transponder by a distance that is an integer multiple of a ¼ wavelength of the wireless transponder when the tubular specimen container is positioned in the aperture with a top end thereof positioned against the stop. Where the wireless transponder is fixed to a specimen straw carried in an interior of the tubular specimen container, the interrogation antenna may be positioned behind the stop of the aperture and spaced from the wireless transponder by a distance that is an integer multiple of a ¼ wavelength of the wireless transponder when the tubular specimen container is positioned in the aperture with a top end thereof positioned against the stop. Where the wireless transponder is fixed to the tubular specimen container, the interrogation antenna may be positioned behind the stop of the aperture and spaced from the wireless transponder by a distance that is an integer multiple of a ¼ wavelength of the wireless transponder when the tubular specimen container is positioned in the aperture with a top end thereof positioned against the stop.

The structure of the aperture may be sized to closely receive the tubular specimen container and positioned relative to the interrogation antenna to position the wireless transponder carried by the tubular specimen container at a defined location in an X-Y plane relative to the interrogation antenna when the tubular specimen container is positioned in the aperture, and the stop may be positioned relative to the interrogation antenna to position the wireless transponder at a defined location along a Z axis when the tubular specimen container is positioned in the aperture with a top end thereof positioned against the stop, the Z axis perpendicular to the X-Y plane.

Where the tubular specimen containers are arranged in an array with a defined spacing between outmost portions of nearest neighboring ones of the tubular specimen containers, the body may have an outer lateral dimension that provides a defined clearance with all neighboring ones of the tubular specimen containers when any one of the tubular specimen containers is positioned in the aperture of the body.

At least a portion of the body may include a retainer carried by the body and positioned to detachable retain the tubular specimen container in the aperture as the body moves. The retainer may, for example, take the form of one or more resilient members that include or form an opening, the opening sized preferably slightly smaller than a largest part of the portion or feature of the tubular specimen container to be gripped. The retainer may, for example, take the form of one or more detents, for instance one or more ball, pins or bearings which are biased by springs (e.g. coil springs, leaf springs) inwardly toward a longitudinal axis of the aperture, or one or more leaf springs which applies a bias force inwardly toward a longitudinal axis of the aperture.

At least a portion of the body may include an image sensor carried by the body and positioned to image an interior portion of the tubular specimen container when the tubular specimen container is positioned in the aperture.

At least a portion of the body may include an optical sensor carried by the body and positioned to capture information from a machine-readable symbol carried by the tubular specimen container when the tubular specimen container is positioned in the aperture.

At least a portion of the body may include a sensor that senses when the tubular specimen container is positioned in the aperture correctly (e.g., at a defined distance) along a longitudinal axis of the aperture, and in response produces a signal that triggers at least one of an interrogation cycle and/or an optical capture of information from the tubular specimen container.

At least a portion of the body may include a shield that is positioned to radially encompass at least a portion of the aperture, the shield providing a diminution to at least one of radio frequency or microwave frequency communications. A portion of the body includes a spacer that spaces the shield radially outward from the aperture.

An interrogation device to read information from wireless transponders may be summarized as including: a body having a proximate end, a distal end, and an elongated receiver at the distal end, the elongated receiver having a longitudinal axis and an inner wall that extends along the longitudinal axis, at least a portion of the inner wall of the elongated receiver sized and shaped to receive an upper end portion of a specimen container at least partially therein, with a lower end portion of the specimen container extending outwardly from the elongated receiver, at least a portion of the body including a shield that is positioned radially about at least a portion of the elongated receiver, the shield which diminishes at least one of radio frequency or microwave frequency communications between an interior of the elongated receiver and an exterior thereof; and an interrogation antenna carried by a portion of the body, the interrogation antenna extending perpendicularly with respect to the longitudinal axis of the elongated receiver, and at least a portion of the interrogation antenna encompassing a projection of a profile of the inner wall of the elongated receiver.

The interrogation antenna encompasses at least a portion of an interior of the elongated receiver. The interrogation antenna may comprise one or more loops of an electrically conductive material. The loop(s) may lie in one or more planes that is or are perpendicular to a longitudinal axis of the elongated receiver. The interrogation antenna may, for example, be positioned in front of a stop of the elongated receiver and radially spaced from the wireless transponder by a distance that is an integer multiple of a ¼ wavelength of the wireless transponder when the tubular specimen container is positioned in the elongated receiver with a top end thereof positioned against the stop.

The interrogation antenna may be positioned behind an end wall of the elongated receiver that provides a terminus to the elongated receiver and that distances the interrogation antenna from one or more wireless transponder physically associated with the specimen container by an integer multiple of a ¼ wavelength of the wireless transponder. The interrogation antenna may be positioned behind an end wall of the elongated receiver that provides a terminus to the elongated receiver and that distances the interrogation antenna by an integer multiple of a ¼ wavelength of the wireless transponder from one or more wireless transponder physically associated with respective ones of one or more specimen straws carried by the specimen container.

The interrogation antenna may take the form of a spiral antenna, positioned behind an end wall of the elongated receiver that provides a terminus to the elongated receiver.

The system may further include an interrogation circuit housed by the body and communicatively coupled to the interrogation antenna.

The body may take any of a variety of forms, each with its own advantages. For example, the body may take the form of a hand-held wand, having an elongated shape, with a handle at or proximate the proximate end thereof. The handle may be shaped and dimensioned to be graspable by a human hand. The body may be pistol shaped, having an included angle between the distal end and the proximate end, for instance an obtuse angle. A handle at the proximate end may be shaped and dimensioned to be graspable by a human hand. Also for example, the body may take the form of an end of arm tool or end effector, that is attached or is attachable to an appendage of a robot. The end of arm tool or end effector may have a coupler at a proximate end thereof to allow detachable coupling to the appendage of the robot.

At least a portion of the inner wall of the elongated receiver may be a profile that may match a profile of an outer portion of a vial of a tubular specimen container. At least a portion of the inner wall of the elongated receiver may have a profile that matches a profile of an outer portion of a cap of a tubular specimen container. At least a portion of the inner wall of the elongated receiver may have a profile that has at least one dimension that may be sized with respect to a corresponding at least one dimension of an outer portion of at least one of a vial or a cap of the tubular specimen container such that the outer portion of at least one of a vial or a cap of the tubular specimen container contacts at least a portion of the inner wall of the elongated receiver around an entirety of the profile of at least the portion of the inner wall while permitting at least one of sliding or rotation therebetween. At least a portion of the inner wall of the elongated receiver may have a profile that has at least one dimension that may be sized with respect to a corresponding at least one dimension of an outer portion of at least one of a vial or a cap of the tubular specimen container to provide a clearance fit therebetween. At least a portion of the inner wall of the elongated receiver may have a profile that has at least one dimension that may be less than ¼ inch larger than a corresponding at least one dimension of an outer portion of at least one of a vial or a cap of the tubular specimen container.

Where the tubular specimen containers are arranged in an array with a defined spacing between outmost portions of nearest neighboring ones of the tubular specimen containers, the body may have an outer lateral dimension that provides a defined clearance with all neighboring ones of the tubular specimen containers when any one of the tubular specimen containers is positioned in the aperture of the body.

At least a portion of the body may include a retainer carried by the body and positioned to detachable retain the tubular specimen container in the elongated receiver as the body moves. The retainer may, for example, take the form of one or more resilient members that include or form an opening, the opening sized preferably slightly smaller than a largest part of the portion or feature of the tubular specimen container to be gripped. The retainer may, for example, take the form of one or more detents, for instance one or more ball, pins or bearings which are biased by springs (e.g. coil springs, leaf springs) inwardly toward a longitudinal axis of the elongated receiver, or one or more leaf springs which applies a bias force inwardly toward a longitudinal axis of the elongated receiver.

At least a portion of the body may include an image sensor carried by the body and positioned to image an interior portion of the tubular specimen container when the tubular specimen container is positioned in the elongated receiver.

At least a portion of the body may include an optical sensor carried by the body and positioned to capture information from a machine-readable symbol carried by the tubular specimen container when the tubular specimen container is positioned in the elongated receiver.

At least a portion of the body may include a sensor that senses when the tubular specimen container is positioned in the elongated receiver correctly (e.g., at a defined distance) along a longitudinal axis of the elongated receiver, and in response produces a signal that triggers at least one of an interrogation cycle and/or an optical capture of information from the tubular specimen container.

At least a portion of the inner wall of the elongated receiver may be sized and positioned relative to the interrogation antenna to position the wireless transponder at a defined location in an X-Y plane relative to the interrogation antenna when the tubular specimen container is positioned in the aperture, and the end wall may be positioned relative to the interrogation antenna to position the wireless transponder at a defined location along a Z axis when the tubular specimen container is positioned in the aperture with a top end thereof positioned against the end wall, the Z axis perpendicular to the X-Y plane.

At least a portion of the body may include a shield that is positioned radially about at least a portion of the elongated receiver, the shield which diminishes at least one of radio frequency or microwave frequency communications by at least −80 db over at least a subset of a frequency range from approximately 50 Mhz to 18 Ghz. A spacer may space the shield radially outward from the elongated receiver and an interrogation antenna of the body.

Thus, a structure (e.g., aperture, elongated receiver) may position a container, removably, with respect to an interrogation antenna and, optionally, an RF or microwave shield. A structure (e.g., stop, end wall) may position the container along a Z-axis with respect to the interrogation antenna. A structure (e.g., inner wall, ribs, standoffs) may positon the container in an XY-plane with respect to the interrogation antenna. Such may advantageously enhance communicative coupling between the interrogation antenna and an antenna of a wireless transponder carried by the container. Such may advantageously reduce communicative coupling between the interrogation antenna and antennas of wireless transponders carried by other containers in the proximity but not currently positioned in the aperture or elongated receiver.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

FIG. 5D is a top plan view of a hand-held wand, according to at least one illustrated implementation.

FIG. 5E is a left side elevational view of the hand-held wand of FIG. 5D, according to at least one illustrated implementation.

FIG. 5F is a distal end elevational view of the hand-held wand of FIG. 5D, according to at least one illustrated implementation.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with wireless transponders, interrogators or interrogation systems, computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

Figure 1:
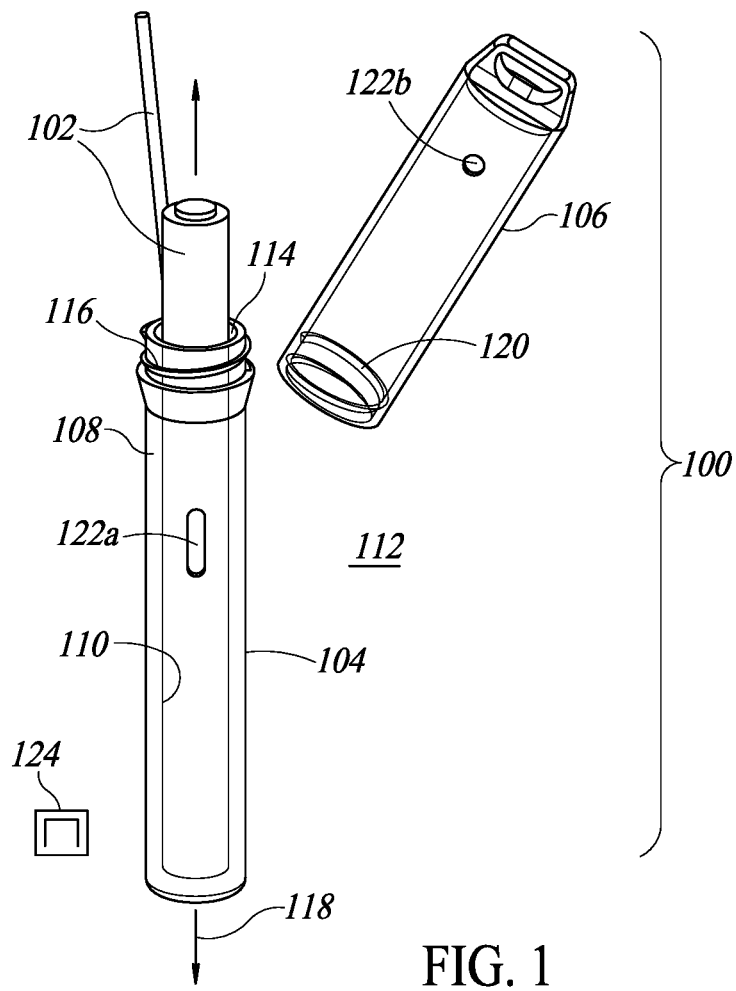
FIG. 1 is an isometric view of a specimen container comprising a vial and cap along with a number of specimen holders stored in the specimen container, according to one illustrated implementation.

FIG. 1 shows a specimen container 100 along with a number of specimen holders 102, according to one illustrated implementation.

The specimen container 100 may comprises a vial 104 and cap 106. The vial 104 is generally tubular, and includes one or more walls 108 that delineate an interior or interior volume 110 from an exterior 112 thereof. The wall 108 or a portion thereof may, for example, be transparent. The vial 104 typically includes an opening 114 at a top thereof which provides access to the interior 110 from the exterior 112. The vial 104 may include a coupler feature 116 proximate the top thereof to detachable secure the cap 106 thereto. The coupler feature 116 may, for example, take the form of a thread, a detent, or a portion of a bayonet mount.

While illustrated as having a circular cross-section or profile, the vial 104 may in some implementations have a non-circular cross-section or profile, for example an oval cross-section or profile, a rectangular cross-section or profile, a square cross-section or profile, a D-shape cross-section or profile, hexagonal cross-section or profile, or octagonal cross-section or profile. In some instances, the vial 104 may have a two or more different cross-sections or profiles that vary from one another along a longitudinal axis or length 118 thereof.

The cap 106 couples to the vial at a top thereof, and is moveable to provide and alternatingly prevent access to the interior 110 from the exterior 112. In some implementations, the cap 106 is completely removably from the vial 104, while in other implementations the cap 106 may remain tethered to the vial 104 even when removed from the opening 114. The cap may include a complementary coupler feature 120, that is complementary to the coupler feature 116 of the vial 104. The complementary coupler feature 120 may, for example, take the form of a thread, a detent, or a portion of a bayonet mount sized, positioned or otherwise configured to engagingly mate with the coupler feature 116 of the vial 104.

The specimen container 100 including the vial 104 and cap 106 may take any of a large variety of forms, and may be composed of any of a large variety of materials (e.g., plastics), for example materials which are suitable to withstand cryogenic temperatures and/or repeated cycling between room temperatures and cryogenic temperatures. The vial 104 and/or the cap 106 may include one or more ports 122a and/or vents 122b to allow ingress and egress of fluid (e.g., liquid nitrogen, air) into and out of the interior 110 of the vial.

The specimen holders 102 may take any of a large variety of forms capable of retaining a biological specimen, for example stored in the specimen container, according to one illustrated implementation. For example, the specimen holders 102 may take the form of cryopreservation straws, cryopreservation tubes, sticks or spatulas. The specimen holders 102 may be composed of any of a large variety of materials (e.g., plastics), for example materials which are suitable to withstand cryogenic temperatures and/or repeated cycling between room temperatures and cryogenic temperatures.

One or more wireless transponders 124 (illustrated separated from the specimen container 100 and/or specimen holders 102 for clarity of the drawing), for example radio frequency identification (RFID) transponders, are physically associated with the specimen container 100 and/or specimen holders 102. For example, one or more wireless transponders 124 may be physically secured to the vial 104, for instance molded thereon, secured thereto via adhesive and/or fasteners, or via an interference fit or even a shrink fit. Also for example, one or more wireless transponders 124 may be physically secured to the cap 106, for instance molded thereon, secured thereto via adhesive and/or fasteners, or via an interference fit or even a shrink fit. Additionally or alternatively, one or more wireless transponders 124 may, for example, be physically secured to the specimen holders 102, for instance molded thereon, secured thereto via adhesive and/or fasteners, or via an interference fit or even a shrink fit.

Typically, the wireless transponder(s) 124 will have an antenna and will be secured to the such that a principal axis of transmission of the antenna is aligned with the longitudinal axis or length 118 of the vial 104, although such is not necessary to operation of the described embodiments. The antenna of the wireless transponder(s) 124, whether attached to the vial 104, cap 106, or specimen holders 102 will also be located at a defined distance along the longitudinal axis or length 118 of the vial 104 from some fixed point (e.g., a top of the cap 106, or top of the vial 104).

Figure 2:
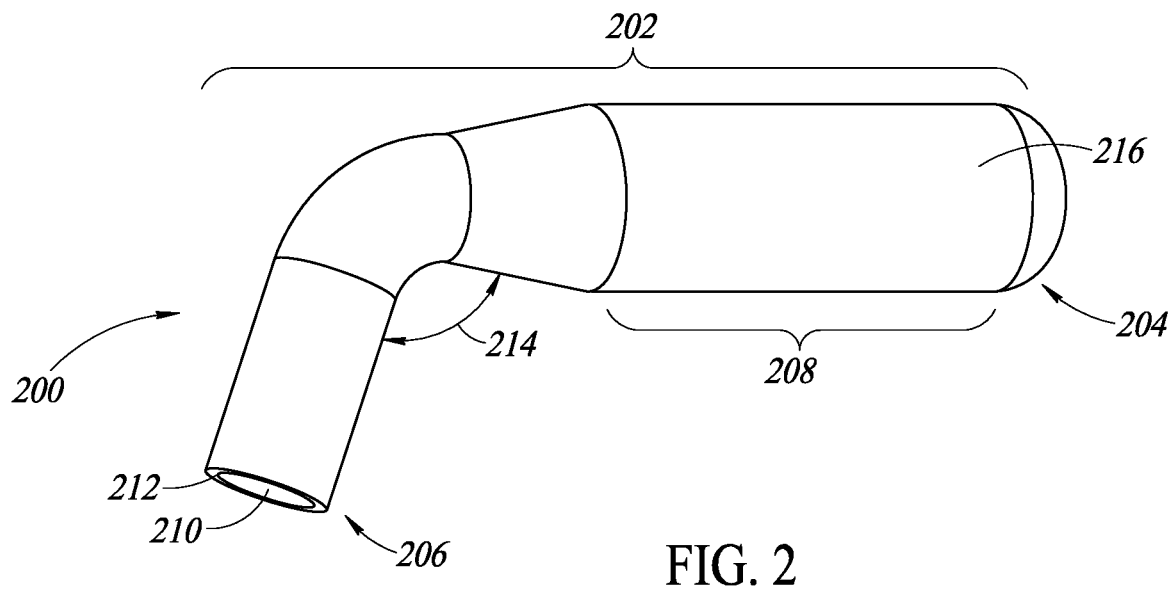
FIG. 2 is an isometric view of an interrogation device or system including a hand-held wand, according to one illustrated implementation.

FIG. 2 shows an interrogation device or system 200 including a hand-held pistol-shaped body 202, according to one illustrated implementation.

The hand-held pistol-shaped body 202 has a proximate end 204, a distal end 206, a handle 208 at the proximate end 204, and an aperture or elongated receiver 210 at the distal end 206. The aperture or elongated receiver 210 has an opening 212 at an outermost portion thereof. As described in more detail elsewhere herein, the aperture or elongated receiver 210 is sized and shaped to closely receive a portion of a tubular specimen container 100 (FIG. 1) therein. The term closely received is used in its conventional mechanical engineering sense, that is received in contact with, although such may allow longitudinal translation and/or rotational about a longitudinal axis.

In at least some implementations, the hand-held pistol-shaped body 202 has an included angle 214 between the distal end 206 and the proximate end 204. The included angle 214 may be an obtuse angle. The handle 208 is may be shaped and dimensioned to be readily graspable by an average human hand. The handle 208 may include an over-mold of a pliable, resilient material 216 to facilitate grasping and comfort.

Figure 4:
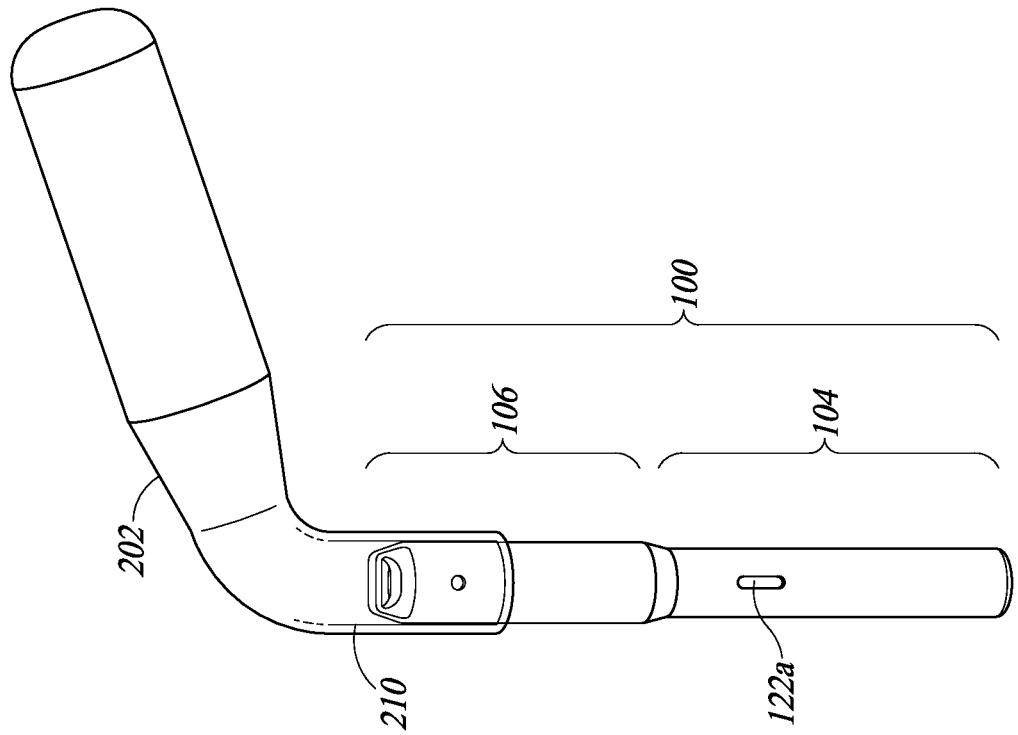
FIG. 4 is cut-away view of the interrogation device or system and the specimen container of FIG. 3.
Figure 3:
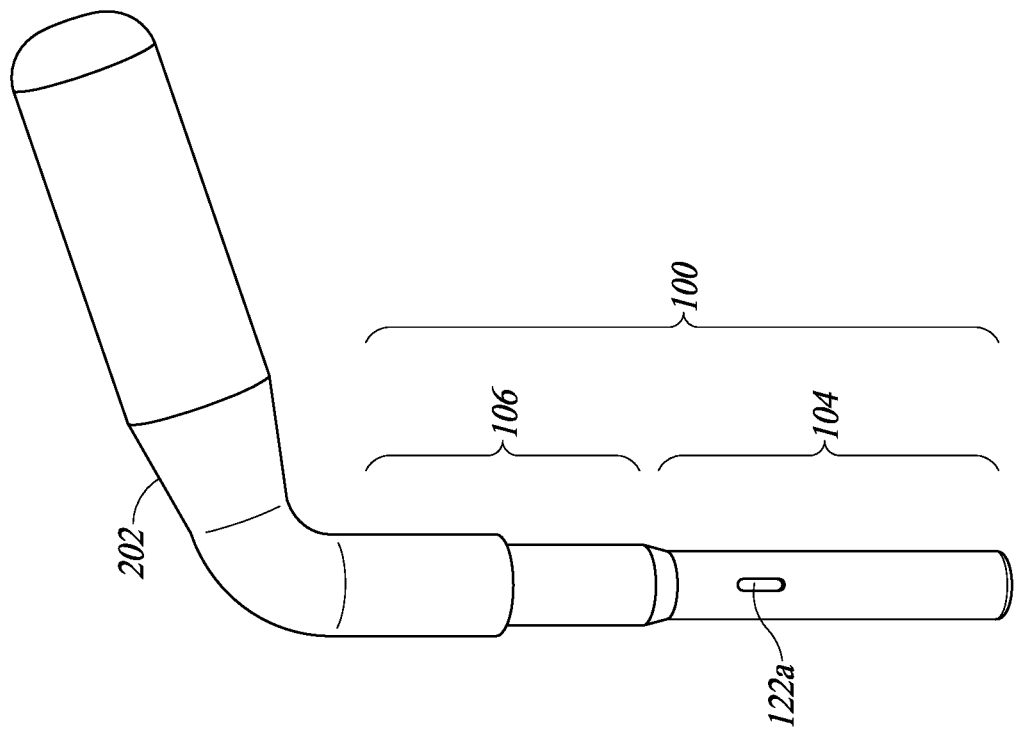
FIG. 3 is an isometric view of the interrogation device or system including a hand-held wand of FIG. 2 and further including a specimen container positioned at least partially in an aperture or receiver of the hand-held wand, according to one illustrated implementation.

FIGS. 3 and 4 show the hand-held pistol-shaped body 202 of the interrogation device or system 200 along with a specimen container 100 positioned at least partially in an aperture or elongated receiver 210 of the hand-held pistol-shaped body 202, according to one illustrated implementation.

Figure 5A:
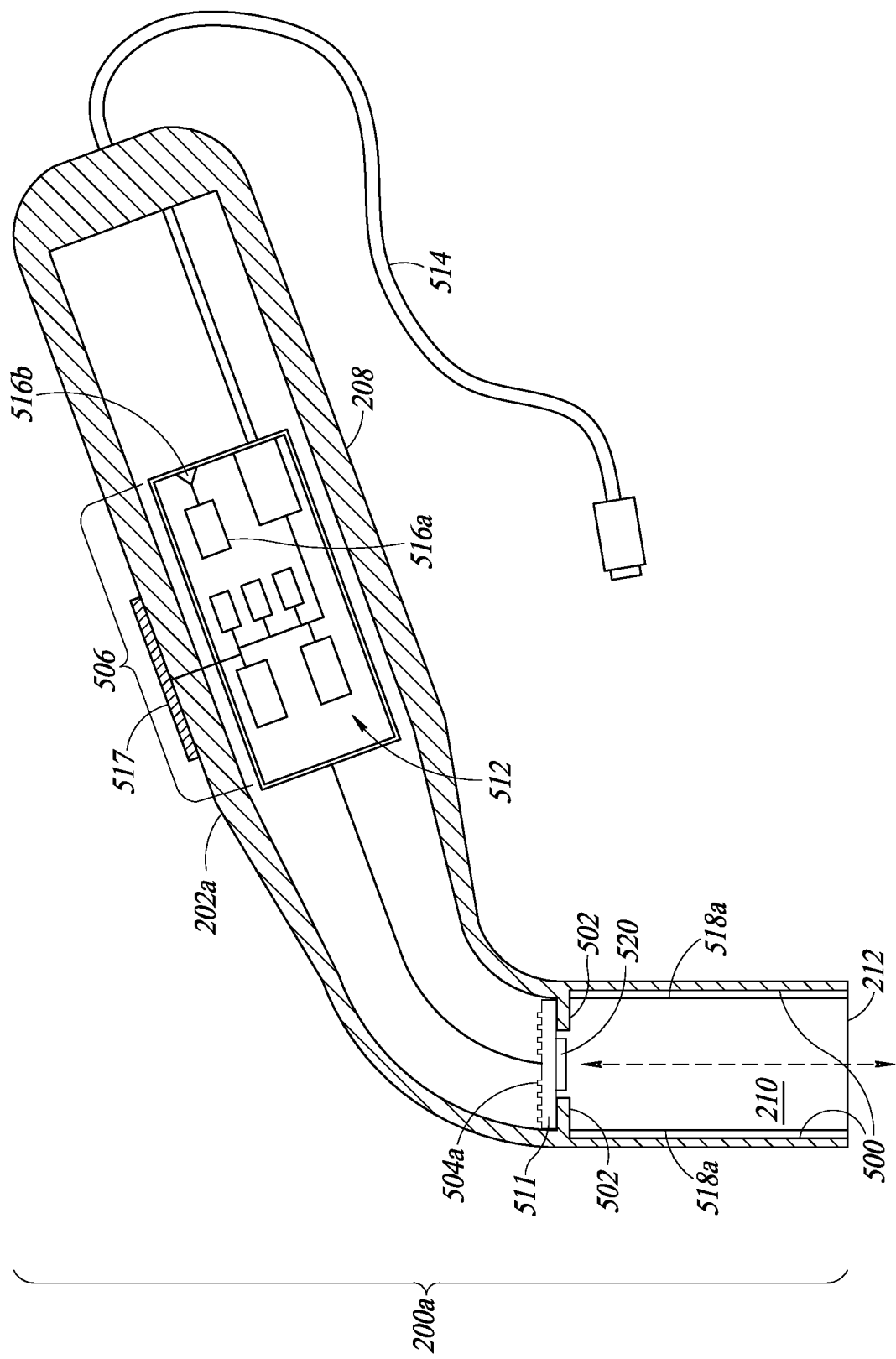
FIG. 5A is a cross-sectional view of the interrogation device or system including a hand-held wand according to at least one illustrated implementation.

FIG. 5A shows a hand-held pistol-shaped body 202*a* of the interrogation device or system 200*a*, according to one illustrated implementation. FIG. 5 is a cross-section taken along a plane that cuts a midline of the hand-held pistol-shaped body 202, where the aperture or elongated receiver 210 is cylindrical, having a circular profile, although such illustration is not intended to be limiting on the shape of the aperture or elongated receiver 210.

FIG. 5A better illustrates an interior of the hand-held pistol-shaped body 202*a* of, including has an inner wall 500, a stop or end wall 502, one or more interrogation antenna 504*a*, and optional circuitry 506, according to at least one illustrated implementation.

As best illustrated in FIG. 5A, the aperture or elongated receiver 210 has an inner wall 500 that defines a longitudinal axis 510. The inner wall 500 is a wall or inner surface that is sized and shaped to receive an upper end portion of a specimen container 100 (FIGS. 1-3) at least partially therein, with a lower end portion of the specimen container 100 extending outwardly from the aperture or elongated receiver 210. For example, the inner wall 500 of the aperture or elongated receiver 210 may have a cross-section or profile that matches a cross-section or profile of an outer portion (e.g., periphery; circumference) of the specimen container 100 (FIGS. 1-3). As previously noted, the specimen container 100 (FIGS. 1-3) comprises a vial 104 and a cap 106 that is selectively removable from the vial 104. Thus, the inner wall 500 of the aperture or elongated 210 may have a profile that matches a profile of an outer portion of the cap 106 (FIG. 1). Alternatively, the inner wall 500 of the aperture or elongated receiver 210 may have a profile that matches a profile of an outer portion of the vial 104 (FIG. 1) with the cap 106 (FIG. 1) removed.

Additionally, the inner wall 500 of the aperture or elongated receiver 210 may have a profile that has at least one dimension that is sized with respect to a corresponding at least one dimension of an outer portion (e.g., periphery, circumference) of the specimen container 100 (FIGS. 1-3) such that the outer portion of the specimen container 100 (FIGS. 1-3) contacts the inner wall 500 of the aperture or elongated receiver 210 around an entirety of the profile of the inner wall 500, for example permitting at least one of sliding or rotation therebetween. Additionally or alternatively, the inner wall 500 of the aperture or elongated receiver 210 may have a profile that has at least one dimension that is sized with respect to a corresponding at least one dimension of an outer portion (e.g., periphery, circumference) of the specimen container 100 (FIGS. 1-3) to provide a clearance fit therebetween. Additionally or alternatively, the inner wall 500 of the aperture or elongated receiver 210 may have a profile that has at least one dimension that is less than ¼ inch larger than a corresponding at least one dimension of an outer portion (e.g., periphery; circumference) of the specimen container 100 (FIGS. 1-3). As previously noted, the specimen container 100 (FIGS. 1-3) comprises a vial 104 (FIG. 1) and a cap 106 (FIG. 1) that is selectively removable from the vial 104. Thus, the inner wall 500 of the aperture or elongated receiver 210 may have a profile that has at least one dimension that is less than ¼ inch larger than a corresponding at least one dimension of a profile of an outer portion (e.g., periphery; circumference) of the cap 106 (FIG. 1). Alternatively, the inner wall 500 of the aperture or elongated receiver 210 may have a profile that that has at least one dimension that is less than ¼ inch larger than a corresponding at least one dimension of a profile of an outer portion (e.g., periphery; circumference) of the vial 104 (FIG. 1) with the cap 106 (FIG. 1) removed.

As illustrated in FIG. 5A, the aperture or elongated receiver 210 has a stop 502, for example an end wall, located inwardly from an outermost opening 212 of the aperture or elongated receiver 210. An end wall provides a terminus to the aperture or elongated receiver 210. A stop 502 may take the form of an end wall or may take the form of one or more projections or other structures that limit travel of the specimen container 100 (FIGS. 1-3) while not necessarily terminating the aperture or elongated receiver 210. The stop or end wall 502 is sized and positioned to limit a distance that the specimen container 100 (FIGS. 1-3) may be inserted into the aperture or elongated receiver 210, which may advantageously be employed to accurately position an antenna of a wireless transponder 124 (FIG. 1) along a Z-axis (i.e., longitudinal axis 510) with respect to the interrogation antenna 504*a* of the hand-held pistol-shaped body 202*a*, as described below. The interrogation antenna 504*a* communicatively couples with wireless transponders 124 (FIG. 1) carried by the specimen containers 100 (FIGS. 1-3) and/or specimen holders 102 (FIGS. 1-3), at least when the specimen container 100 (FIGS. 1-3) is properly positioned in the aperture or elongated receiver 210.

The interrogation antenna 504*a* may take any of a variety of forms, particularly those used with interrogation of wireless transponders 124 (FIG. 1), for example RFID transponders or RFID tags. The interrogation antenna 504*a* may be carried by a substrate, for example a printed circuit board 511, and may reside on one or more exterior surfaces thereof and/or an interior layer (e.g., electronically conductive layer) thereof, and may include a portion that extends through one or more layers by a via. In some implementations, the printed circuit board 511 itself forms the stop or end wall 502. While one interrogation antenna 504*a* is illustrated, some implementations may include two or more interrogation antenna 504*a*.

The interrogation antenna 504*a* is positioned behind the stop or end wall 502 of the aperture or elongated receiver 210. The interrogation antenna 504*a* may advantageously be spaced from the wireless transponder 124 (FIG. 1) by a distance that is an integer multiple of a ¼ wavelength of the wireless transponder 124 (FIG. 1) when the specimen container 100 (FIGS. 1-3) is positioned in the aperture or elongated receiver 210 with a top end of the specimen container 100 positioned against the stop or end wall 502. Where the wireless transponder 124 (FIG. 1) is fixed to a specimen holder 102 (FIG. 1) carried in an interior of the specimen container 100 (FIGS. 1-3), the interrogation antenna 504*a* is positioned behind the stop or end wall 502 of the aperture or elongated receiver 210 and spaced from the wireless transponder 124 (FIG. 1) by a distance that is an integer multiple of a ¼ wavelength of the wireless transponder 124 (FIG. 1) when the specimen container 100 (FIGS. 1-3) is positioned in the aperture or elongated receiver 210 with a top end of the specimen container 100 positioned against the stop or end wall 502. Where the wireless transponder 124 (FIG. 1) is fixed to the specimen container 100 (FIGS. 1-3), the interrogation antenna 504a is positioned behind the stop or end wall 502 of the aperture or elongated receiver 210 and spaced from the wireless transponder 124 (FIG. 1) by a distance that is an integer multiple of a ¼ wavelength of the wireless transponder 124 (FIG. 1) when the specimen container 100 (FIGS. 1-3) is positioned in the aperture or elongated receiver 210 with a top end of the specimen container 100 positioned against the stop or end wall 502.

The interrogation antenna 504a and/or the printed circuit board 511 carried by a portion of the hand-held pistol-shaped body 202a may, for example extend perpendicularly with respect to the longitudinal axis 510 of the aperture or elongated receiver 210. In at least some implementations, at least a portion of the interrogation antenna 504a and/or the printed circuit board 511 resides within a projection of a profile of the inner wall 500 of the aperture or elongated receiver 210.

Thus, the aperture or elongated receiver 210 is sized and positioned relative to the interrogation antenna 504a to position the wireless transponder 124 (FIG. 1) at a defined location in an X-Y plane relative to the interrogation antenna 504a when the specimen container 100 (FIGS. 1-3) is positioned in the aperture or elongated receiver 210, and the stop or end wall 502 is positioned relative to the interrogation antenna 504a to position the wireless transponder 124 (FIG. 1) at a defined location along a Z axis when the specimen container 100 (FIGS. 1-3) is positioned in the aperture or elongated receiver 210 with a top end of the specimen container 100 positioned against the stop or end wall 502, the Z axis perpendicular to the X-Y plane.

The optional circuitry 506 may include an interrogation circuit 512 communicatively coupled to the interrogation antenna 504a via one or more communicative paths. In some implementations, the interrogation circuit 412 is housed by the hand-held pistol-shaped body 202a. Alternatively, one portion, more portions or all the interrogation circuit 512, other than the interrogation antenna 504a, may be housed separately from the hand-held pistol-shaped body 202. In such implementations, the hand-held pistol-shaped body 202a may include a cable 514 that communicatively couples the interrogation antenna 504a with the externally located interrogation circuit. Additionally or alternatively, the hand-held pistol-shaped body 202a may include a communications radio 516a and communications antenna 516b that communicatively couples the interrogation antenna 504a with the externally located interrogation circuit. An example interrogation circuit 512 is described elsewhere herein with reference to FIG. 11. Additionally or alternatively, the hand-held pistol-shaped body 202a may include one or more user interface elements, for example a display (e.g., LCD display) 517, lights (e.g., LEDs), speakers, microphones, haptic engines, etc. operable to allow input to the circuitry 506 and/or output from the circuitry 506. The display 517 may, for example, take the form of a touch-sensitive display screen, which may for instance present a graphical user interface allow a user to interact with the hand-held pistol-shaped body 202a, for example trigger interrogation or reading or manipulating information discerned from interrogation.

Optionally, at least a portion of the hand-held pistol-shaped body 202a includes a shield 518a that is positioned to radially encompass at least a portion of the aperture or elongated receiver 210, the shield 518a providing shielding to at least one of radio frequency or microwave frequency communications. For example, the shield 518a may peripherally encompass the interrogation antenna 504a, and may extend distally and/or proximally therefrom to form a protective sleeve. Additionally or alternative, the shield 518a may, for example, peripherally encompass the wireless transponder 124 (FIG. 1) when the specimen container 100 (FIGS. 1-3) is positioned in the aperture or elongated receiver 210 with a top end of the specimen container 100 positioned against the stop or end wall 502. The shield 518a at least reduces a signal strength of communications between the interior and the exterior of the aperture or elongated receiver 210 in at least a portion of the electromagnetic spectrum in which interrogation signals are transmitted and/or returned or response signals are returned (e.g., scattered back), and may even completely eliminate communications the interior and the exterior of the aperture or elongated receiver 210, although a diminution of at least −80 db over at least a subset of a frequency range from approximately 50 Mhz to 18 Ghz may be sufficient. Thus, the shield 518a may provide a shielded volume in which the interrogation antenna 504a and a selected wireless transponder 124 can co-habit, reducing interference and cross-talk with other wireless transponders, eliminating the need for the use of singulation techniques where multiple wireless transponders are present, and providing a logical and/or visual association between an identifier wireless read from a select wireless transponder and a particular specimen container that the select wireless transponder is physically associated.

The shield 518a may take any of a variety of forms, for example one or more layers of metal foil, metallic ink layer, a metal mesh or screen with opening dimensions suitable for the particular range of frequencies to be diminished. The shield 518a may be composed or comprised of a variety of materials, for example metals for instance aluminum, nickel, copper, brass, silver, tin, steel, a mu-metal, and/or combinations of the same. The shield 518a may, for example, be formed on or take the form of the inner wall 500, be formed or take the form of an outer wall, or may be formed as an inner layer of a wall that delimits the aperture or elongated receiver 210.

Optionally, at least a portion of the hand-held pistol-shaped body 202a includes one or more optical sensors for instance a photodiode or an imager (e.g., digital camera) 520. The imager 520 may, for example, be located behind the stop 502, and spaced with respect thereto to provide a defined distance between the imager 520 and one or more indicia (e.g., machine-readable symbols including one-dimensional machine-readable symbols typically referred to as barcode symbols, and two-dimensional machine-readable symbols for instance QR code machine-readable symbols or DataMatrix machine-readable symbols) carried or borne by the specimen container 100 (FIGS. 1-3) when the specimen container 100 (FIGS. 1-3) is positioned in the aperture or elongated receiver 210 with a top end of the specimen container 100 positioned against the stop or end wall 502 to ensure proper focusing of the imager 520. The imager 520 may, for example, be used to optically capture information from capture one or more indicia (e.g., machine-readable symbols) carried or borne by the specimen container 100 (FIGS. 1-3), for example identification information (e.g., unique identifier for the specimen, patient name or identifier and/or date of birth, clinic identifier, clinician identifier, procedure, times, dates). The imager 520 may, for example, be mounted to or otherwise carried by the printed circuit board 511. While generally discussed in terms of image-based reading of machine-readable symbols, other structures and approaches may employed, for instance a laser source and photodiode based flying spot type machine-readable symbol reader.

Additionally or alternatively, the imager 520 may be used to sense or capture information used to determine when a top end of the specimen container 100 is correctly positioned against the stop or end wall 502, which may be used to automatically and autonomously trigger an interrogation sequence by the circuitry and/or an optical capture of information from the tubular specimen container. For instance, a processor (e.g., GPU) may determine whether images captured by the imager 520 of a portion of the specimen container 100 or indicia carried thereby are in focus, where the images will be in focus when the portion of the specimen container 100 or indicia are correctly positioned at a defined focal distance from the imager 520. Also for instance, the imager 520 may be part of a time of flight camera.

Additionally or alternatively, other types of sensors may be used to sense or capture information used to determine or detect correct positioning of the specimen container 100, for instance correct positioning along the Z-axis) (e.g., when a top end of the specimen container 100 is correctly positioned against the stop or end wall 502), which may be used to automatically and autonomously trigger an interrogation sequence by the circuitry. Sensors may, for example, include one or more of contact switches, momentary switches, optical detectors for instance an infrared light emitting diode and sensor pair, range finder, time of flight camera.

The automatic and autonomous triggered interrogation (e.g., an interrogation cycle) may improve overall interrogation since such is triggered based on correct positioning of the interrogation antenna with the antenna of the wireless transponder. The automatic and autonomous triggered optical capture of information from the tubular specimen container may improve overall optical capture of information from the tubular specimen container since such is triggered based on correct positioning of the image sensor with respect to a portion of the specimen container 100.

Notably, the imager 520 or some other image sensor carried by the body may be positioned to image an interior portion of the tubular specimen container 100 when the tubular specimen container 100 is positioned in the aperture or elongated receiver 210. Such may allow the imager to capture images of a contents of the tubular specimen container 100. A processor may process the images to, for example, determine a total number and position of specimen holders (e.g., cryopreservation straw, cryopreservation tube, cryopreservation stick or cryopreservation spatula) in the tubular specimen container 100.

Figure 5B:
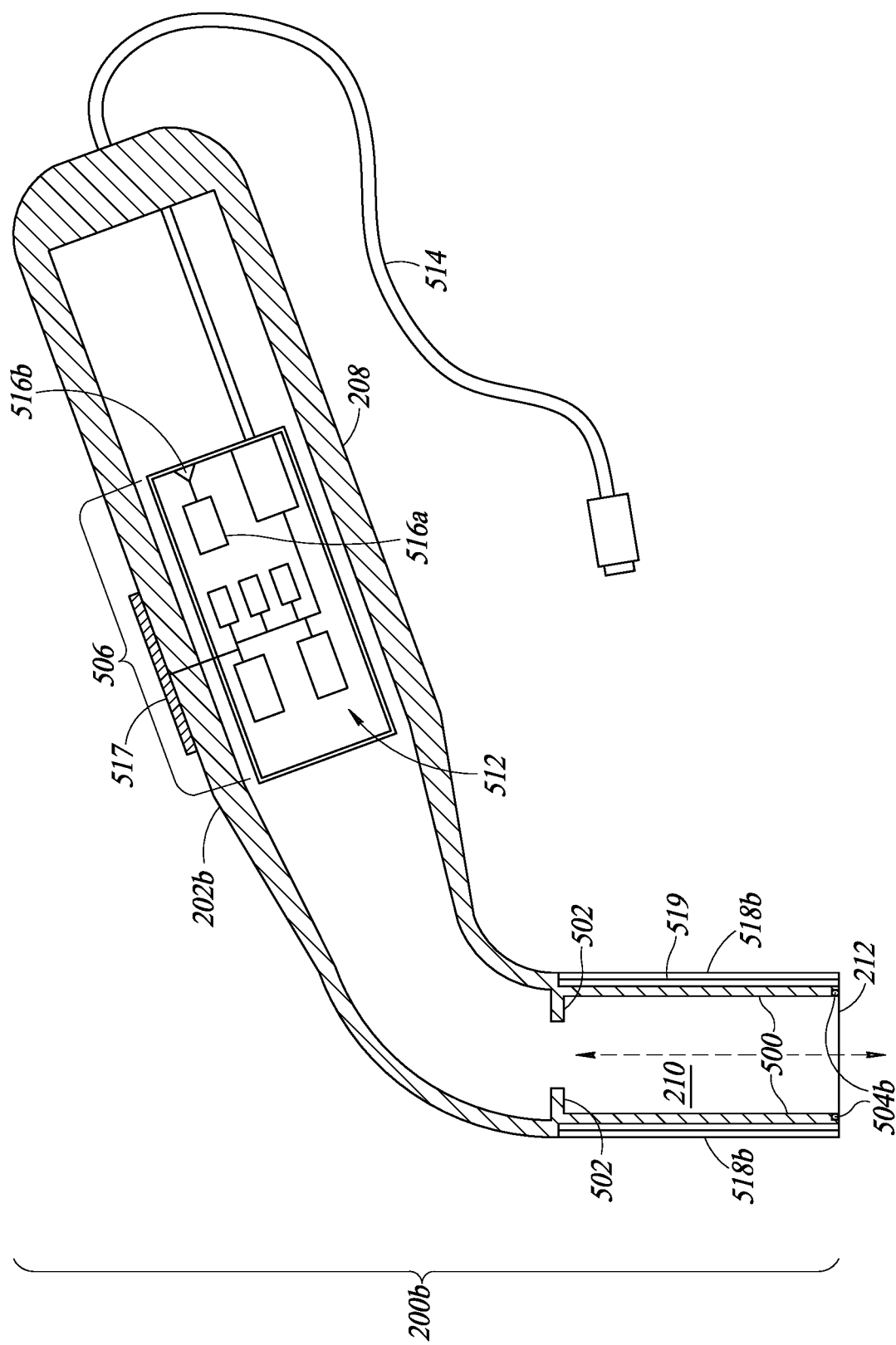
FIG. 5B is a cross-sectional view of the interrogation device or system including a hand-held wand according to at least one illustrated implementation.

FIG. 5B shows a hand-held pistol-shaped body 202b of the interrogation device or system 200b, according to one illustrated implementation. FIG. 5B is a cross-section taken along a plane that cuts a midline of the hand-held pistol-shaped body 202b, where the aperture or elongated receiver 210 is cylindrical, having a circular profile, although such illustration is not intended to be limiting on the shape of the aperture or elongated receiver 210.

FIG. 5B better illustrates an interior of the hand-held pistol-shaped body 202b, including has an inner wall 500, a stop or end wall 502, one or more interrogation antenna 504b, and optional circuitry 506, according to at least one illustrated implementation. The hand-held pistol-shaped body 202b of FIG. 5B is similar in at least some respects to the hand-held pistol-shaped body 202a illustrated in FIG. 5A. Similar, or even identical structures, are indicated using the same reference numbers in FIG. 5B as used in FIG. 5A and the corresponding discussion, and in many instances description of those similar or even identical structures are not repeated below out of the interest of conciseness.

In contrast to that illustrated in FIG. 5A, the hand-held pistol-shaped body 202b of FIG. 5B includes an interrogation antenna 504b in the form of one or more loops, which may be open loops or closed loops or a combination of open and closed loops.

The interrogation antenna 504b may, for example, include one or more loops that reside in a plane or which are parallel to a plane, or alternatively with loops that lie in parallel planes to one another. Alternatively, other antennas may be employed, for example a T-shape dipole antenna, a spiral antenna, or even a helical antenna.

The plane of the interrogation antenna 504b may, for example, be perpendicular with respect to the longitudinal axis 510 of the aperture or elongated receiver 210. The interrogation antenna 504b may be positioned at any of a variety of positions, for example based on the location of the wireless transponder on the containers to be interrogated. As noted, it may be advantageous to locate the interrogation antenna 504b an integer multiple of a wavelength of communications for the wireless transponder (e.g., an integer multiple of a ¼ wavelength of the primary communications frequency band of the wireless transponder. The interrogation antenna 504b may be positioned in front (i.e., toward the distal end) of the stop 502 as illustrated in FIG. 5B, or behind (i.e., toward the proximal end) the stop 502. along the length of the aperture or elongated receiver 210. For example, the interrogation antenna 504b may be positioned at or at least proximate a distal end of the aperture or elongated receiver 210, such as illustrated in FIG. 5B. Alternatively, the interrogation antenna 504b may be positioned at or at least proximate the proximal end of the aperture or elongated receiver 210, or at any of a variety of positions between the distal or proximate ends of the aperture or elongated receiver 210. It may, for example, be advantageous to locate the interrogation antenna 504b such that the wireless transponder carried by the container will reside in the plane of, or be either planar or substantially planar with a plane of the interrogation antenna 504b As used herein "substantially planar" means residing within a volume that extends above and below the plane in which the interrogation antenna 504b lies by plus or minus one half (½) wavelength of the wavelength (i.e., center band) of the frequency of the interrogation signal or return signal used to interrogate the wireless transponder. In some implementations, the interrogation antenna 504b is positioned along the Z-axis from the stop to ensure that an antenna of the wireless transponder is planar or substantially planar with the interrogation antenna 504b when the container is positioned in the aperture or elongated receiver 210 with one end thereof adjacent or against the stop.

The interrogation antenna 504b may, for example, wrap completely or partially around the aperture or elongated receiver 210 completely or partially encompassing a profile of the aperture or elongated receiver 210. The interrogation antenna 504b may have a profile that has a shape that matches or confirms to a shape of a profile of the inner wall of the aperture or elongated receiver 210, for instance having an annular profile, a circular profile, an oval profile, a rectangular profile, a square profile, a D-shape profile, a hexagonal profile, or a hexagonal profile, etc.

The interrogation antenna 504b may, for example, comprise an electrically conductive (e.g., metal) wire or foil carried on an inner surface of the aperture or elongated receiver 210, for instance in a recess, as illustrated in FIG. 5B. Employing a recess may advantageously cause the interrogation antenna 504b to be flush with the inner surface of a majority of the aperture or elongated receiver 210 allowing smooth ingress and egress of container into and out of the aperture or elongated receiver 210. Alternatively or additionally, the interrogation antenna 504b may be carried on an outer surface of the aperture or elongated receiver 210, and/or the interrogation antenna 504b may be carried on one or more inner layers of the aperture or elongated receiver 210 between the inner and outer surfaces thereof. While not illustrated, the interrogation antenna 504b may include an electrical insulation, for instance an electrically insulative sheath, or the aperture or elongated receiver 210 may include an electrically insulative layer that overlies the interrogation antenna 504b, providing environmental protection thereto. Such may be particularly advantageous where a foil is employed as the interrogation antenna 504b.

The interrogation antenna 504b may, for example, have an inner dimension (e.g., inner diameter) and an outer dimension (e.g., outer diameter). The interrogation antenna 504b may, for example be aligned along the longitudinal axis 510 of the aperture or elongated receiver 210. The inner dimension of the interrogation antenna 504b may, for example match an inner dimension of the aperture or elongated receiver 210 or may be larger than the inner dimension of the aperture or elongated receiver 210, encompassing the same. The outer dimension of the interrogation antenna 504b may, for example match an inner dimension of the aperture or elongated receiver 210 or may be larger than the inner dimension of the aperture or elongated receiver 210 encompassing the same. The outer dimension of the interrogation antenna 504b may, for example match an outer dimension of the aperture or elongated receiver 210 or may be larger than the outer dimension of the aperture or elongated receiver 210, encompassing the same.

Similar to that described with respect to FIG. 5A, the stop 502 illustrated in FIG. 5B is sized and positioned to limit a distance that the specimen container 100 (FIGS. 1-3) may be inserted into the aperture or elongated receiver 210, which may advantageously be employed to accurately position an antenna of a wireless transponder 124 (FIG. 1) along a Z-axis (i.e., longitudinal axis 510) with respect to the interrogation antenna 504b of the hand-held pistol-shaped body 202b, as described below. The structure of the aperture or elongated receiver 210 may optionally be sized and positioned relative to the interrogation antenna 504b to position the wireless transponder 124 (FIG. 1) at a defined location in an X-Y plane relative to the interrogation antenna 504b when the specimen container 100 (FIGS. 1-3) is positioned in the aperture or elongated receiver 210. The, the stop or end wall 502 is positioned relative to the interrogation antenna 504b to position the wireless transponder 124 (FIG. 1) at a defined location along a Z axis when the specimen container 100 (FIGS. 1-3) is positioned in the aperture or elongated receiver 210 with a top end of the specimen container 100 positioned against the stop or end wall 502, the Z axis perpendicular to the X-Y plane. Additionally, structure of the aperture or elongated receiver 210 may be positioned relative to the interrogation antenna 504b to position the wireless transponder 124 (FIG. 1) at a defined location in an XY plane when the specimen container 100 (FIGS. 1-3) is positioned in the aperture or elongated receiver 210 with a top end of the specimen container 100 positioned against the stop or end wall 502, the Z axis perpendicular to the X-Y plane.

The hand-held pistol-shaped body 202b of FIG. 5B also includes a shield 518b, and in contrast to that illustrated in FIG. 5A, the shield 518b illustrated in FIG. 5B is positioned outwardly of the inner wall 500 of the aperture or elongated receiver 210.

The shield 518b is positioned to radially encompass at least a portion of the aperture or elongated receiver 210, the shield 518b providing shielding to at least one of radio frequency or microwave frequency communications. For example, the shield 518b may peripherally encompass the interrogation antenna 504b, and may extend distally and/or proximally therefrom to form a protective sleeve. Additionally or alternative, the shield 518b may, for example, peripherally encompass the wireless transponder 124 (FIG. 1) when the specimen container 100 (FIGS. 1-3) is positioned in the aperture or elongated receiver 210 with a top end of the specimen container 100 positioned against the stop or end wall 502. The shield 518b at least reduces a signal strength of communications between the interior and the exterior of the aperture or elongated receiver 210 in at least a portion of the electromagnetic spectrum in which interrogation signals are transmitted and/or returned or response signals are returned (e.g., scattered back), and may even completely eliminate communications the interior and the exterior of the aperture or elongated receiver 210, although a diminution of at least −80 db over at least a subset of a frequency range from approximately 50 Mhz to 18 Ghz may be sufficient. Thus, the shield 518b may provide a shielded volume in which the interrogation antenna 504b and a selected wireless transponder 124 can co-habit, reducing interference and cross-talk with other wireless transponders, eliminating the need for the use of singulation techniques where multiple wireless transponders are present, and providing a logical and/or visual association between an identifier wireless read from a select wireless transponder and a particular specimen container that the select wireless transponder is physically associated.

The shield 518b may take any of a variety of forms, for example one or more layers of metal foil, metallic ink layer, a metal mesh or screen with opening dimensions suitable for the particular range of frequencies to be diminished. The shield 518b may be composed or comprised of a variety of materials, for example metals for instance aluminum, nickel, copper, brass, silver, tin, steel, a mu-metal, and/or combinations of the same. The shield 518b may, for example, be formed on or take the form of the inner wall 500, be formed or take the form of an outer wall, or may be formed as an inner layer of a wall that delimits the aperture or elongated receiver 210.

In at least some implementations, a spacer 519 may space the shield 518b from the interrogation antenna 504b and/or the aperture or elongated receiver 210. The spacer 519 may take a variety of forms, for example a closed cell or open cell foam material (e.g., foam rubber).

Figure 5C:
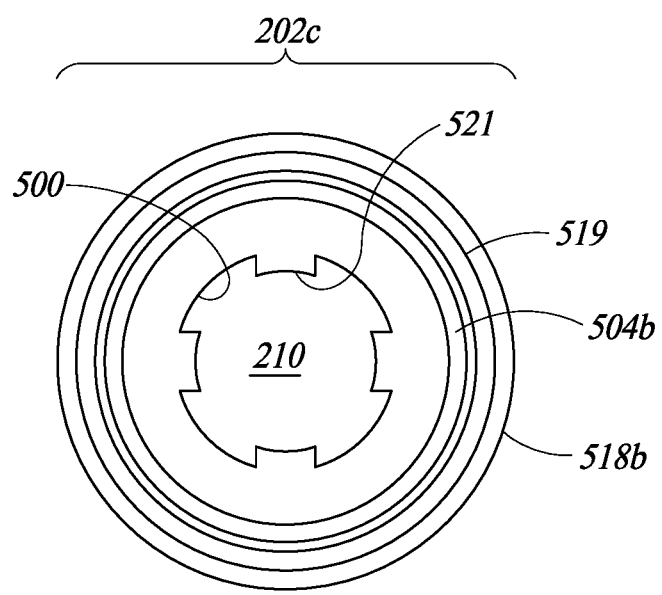
FIG. 5C is a proximate end view of a portion of a body of an interrogation device or system according to at least one illustrated implementation which includes ribs or other alignment features within the aperture or elongated receiver.
Figure 5G:
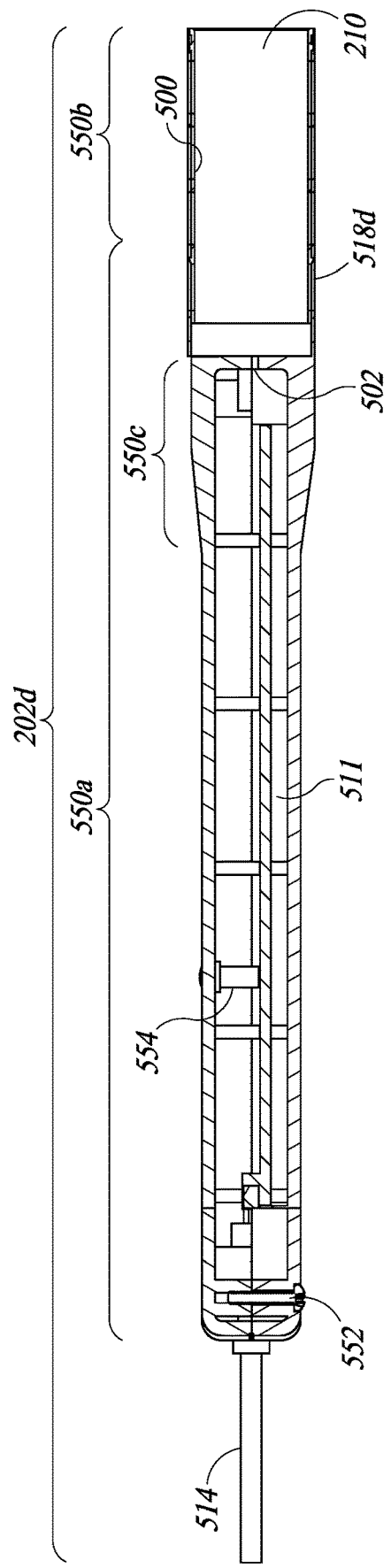
FIG. 5G is a cross-sectional view of the hand-held wand of FIG. 5D taken along section line A-A, according to at least one illustrated implementation.

FIG. 5C shows a portion of a body 202c of an interrogation device or system, according to at least one illustrated implementation.

Figure 7:
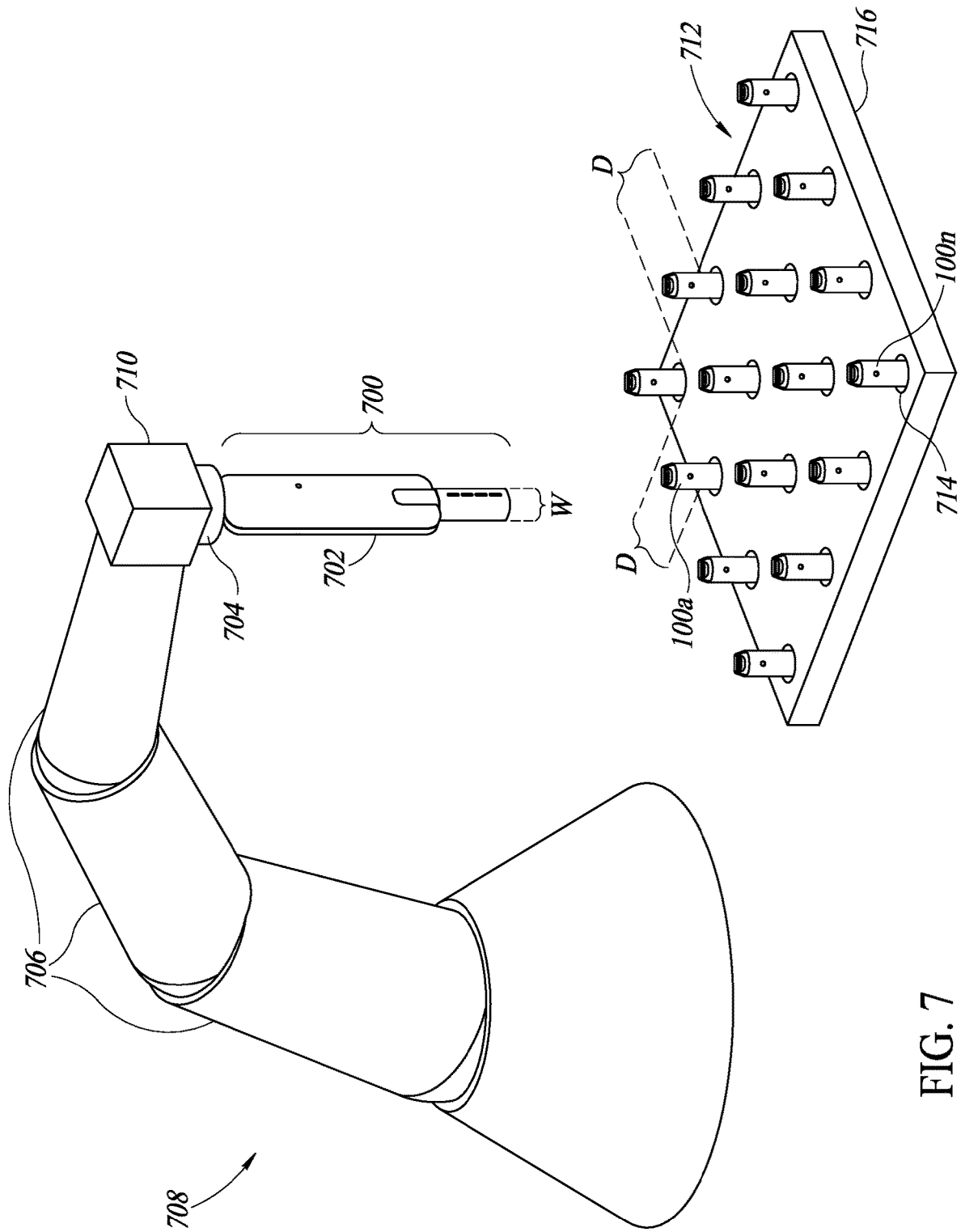
FIG. 7 is an isometric view of an interrogation device or system in the form of an end of arm tool or end effector coupled to an appendage of a robot to perform pick and place operations on tubular specimen containers stored in an array, according to at least one illustrated implementation.

The body 202c of FIG. 5C is similar in at least some respects to the hand-held pistol-shaped body 202a illustrated in FIG. 5A, the hand-held pistol-shaped body 202b illustrated in FIG. 5B, the hand-held wand-shaped body 202d illustrated in FIGS. 5D-5G and/or the end of arm tool or end effector 700 illustrated in FIG. 7. Similar, or even identical structures, are indicated using the same reference numbers in FIG. 5C as used in FIGS. 5A, 5B, 5D-5G and/or 7 and the corresponding discussion, and in many instances description of those similar or even identical structures are not repeated below out of the interest of conciseness.

In contrast to that illustrated in FIGS. 5A, 5B, 5D-5G, and 7, body 202c of FIG. 5C includes a plurality of ribs 521 or other alignment structures in the aperture or elongated receiver 210. The ribs 521 may be distributed about the inner wall 500, extending inwardly therefrom. The ribs 521 may run along all or a portion of a length of the aperture or elongated receiver 210. For example, ribs 521 may be located at or proximate a distal end and a proximate end of the aperture or elongated receiver 210. The ribs 521 may have an inner profile that is sized and shaped to closely receive the specimen containers 100 (FIGS. 1-3), either with or with caps, to align the containers with respect to an XY-plane when the specimen container 100 is partially inserted into the aperture or elongated receiver 210. For example, where the specimen container 100 (FIGS. 1-3) is a cylindrical tube, the ribs 521 may each have an arcuate inner face, with a radius that at least approximately matches the radius of the specimen container 100.

Implementations using ribs may advantageously provide one or more paths (e.g. between the ribs) allowing fluid (e.g., liquid nitrogen) to evacuate out of the interior of the aperture or elongated receiver 210, for instance as the specimen container 100 moves inwardly in the aperture or elongated receiver 210, thereby alleviating any pressure build up that might otherwise limit or prevent the successful positioning of the specimen container 100 for reading.

FIGS. 5D, 5E, 5F, 5G and 5H show a hand-held wand-shaped body 202d, according to at least one illustrated implementation.

The hand-held wand-shaped body 202d of FIGS. 5D-5H is similar in at least some respects to the hand-held pistol-shaped body 202a illustrated in FIG. 5A, the hand-held pistol-shaped body 202b illustrated in FIG. 5B and/or the hand-held wand-shaped body 202c illustrated in FIG. 5C. Similar, or even identical structures, are indicated using the same reference numbers in FIGS. 5D-5H as used in FIGS. 5A, 5B and/or 5C and the corresponding discussion, and in many instances description of those similar or even identical structures are not repeated below out of the interest of conciseness.

In contrast to that illustrated in FIGS. 5A, 5B and 5C, the hand-held wand-shaped body 202d of FIGS. 5D-5H is a substantially straight wand, not shaped like a pistol.

The hand-held wand-shaped body 202d includes a housing 550 having a proximate portion 550a in which a circuit board 511 carrying circuitry (not visible in FIGS. 5D-5H) is housed, and a distal portion 550b which forms the aperture or elongated receiver 210. The proximate portion 550a may be sized and shaped to be readily gripped by a single hand of a human user. The distal portion 550b may take the form of a tube (e.g., cylindrical tube) that extends from the proximate portion. The housing may include a flared region 550c (see FIG. 5G) that extends between the proximate and distal portions 550a, 550b. The housing 550 may, for example, take the form of a clam shell housing, with portions thereof joined together via one or more fasteners (e.g., screws, bolts, tabs, detents, adhesives) 552 (only one shown). The housing 550 may, for example, include one or more ports 558 (four shown on one side, there can be ports on the opposing side as well) that allow ingress and/or egress of fluid between an interior of the aperture or elongated receiver 210 and an exterior of the housing 550. Such may be advantageously particularly where the inner wall 500 of the aperture or elongated receiver 210 is sized to closely receive the outer wall of the specimen container 100, allow fluid (e.g., liquid nitrogen) to evacuate out of the interior, for instance as the specimen container 100 moves inwardly in the aperture or elongated receiver 210, thereby alleviating any pressure build up that might otherwise limit or prevent the successful positioning of the specimen container 100 for reading.

The hand-held wand-shaped body 202d may also include one or more user interface components, for example a light pipe, optical fiber or other structure 554 that communicative couples between a circuitry component (e.g., LED) carried on the circuit board 511 and an exterior of the housing 550. Such may, for example, allow one or more visual indications to be provided to a user, for instance a specific color light signal (e.g., red, green, yellow), a temporally encoded light signal (e.g., pattern of ON/OFF conditions of a one color of light or multiple colors of light), or some other signal indicative of one or more operational conditions of the hand-held wand-shaped body 202d including for instance indicating each time an interrogation signal is transmitted by the hand-held wand-shaped body 202d, response received from a wireless transponder, or even indicative of the information being read thereby via wireless interrogation.

Figure 5H:
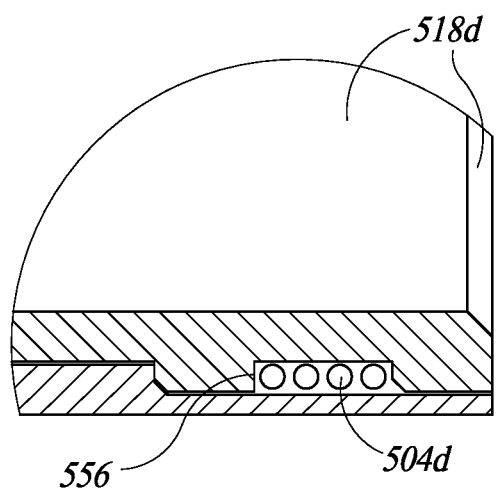
FIG. 5H is an enlarged view of a detail portion C of the hand-held wand of FIG. 5D, according to at least one illustrated implementation.

As best illustrated in FIG. 5H, the interrogation antenna 504d may comprise on or more windings (four shown, only one called out) and may be positioned in a channel or other recess 556 in the inner wall 500 of the distal portion 550b of the housing 550, for example at or proximate an outermost end of the distal portion 550b.

A shield 518d in the form of a metal layer (e.g., metal foil, metal mesh) carried on an inner surface of a sleeve is positioned to radially encompass the aperture or elongated receiver 210, extending along the length thereof. The shield 518d shields the interrogation antenna 504d from at least one of radio frequency or microwave frequency communications with elements located outside of the aperture or elongated receiver 210. The shield 518d may, for example, peripherally encompass the wireless transponder 124 (FIG. 1) when the specimen container 100 (FIGS. 1-3) is positioned in the aperture or elongated receiver 210 with a top end of the specimen container 100 positioned against the stop or end wall 502. The shield 518d at least reduces a signal strength of communications between the interior and the exterior of the aperture or elongated receiver 210 in at least a portion of the electromagnetic spectrum in which interrogation signals are transmitted and/or returned or response signals are returned (e.g., scattered back), and may even completely eliminate communications the interior and the exterior of the aperture or elongated receiver 210. Thus, the shield 518d may provide a shielded volume in which the interrogation antenna 504d and a selected wireless transponder 124 can co-habit, reducing interference and cross-talk with other wireless transponders, eliminating the need for the use of singulation techniques where multiple wireless transponders are present, and providing a logical and/or visual association between an identifier wireless read from a select wireless transponder and a particular specimen container that the select wireless transponder is physically associated.

As in the previously described implementations, the aperture or elongated receiver 210 may have a stop or end wall 502 (FIG. 5G) that is sized and positioned to limit a distance that the specimen container 100 (FIGS. 1-3) may be inserted into the aperture or elongated receiver 210, which may advantageously be employed to accurately position an antenna of a wireless transponder 124 (FIG. 1) along a Z-axis (i.e., longitudinal axis 510) with respect to the interrogation antenna 504*d* of the hand-held wand-shaped body 200*d*. As in the previously described implementations, the structure of the aperture or elongated receiver 210 may have an inner profile that is sized and shaped to receive the specimen containers 100 (FIG. 1), for example closely receiving such in a clearance fit, either with or with caps, to align the containers with respect to an XY-plane when the specimen container 100 is partially inserted into the aperture or elongated receiver 210. For example, where the specimen container 100 (FIGS. 1-3) is a cylindrical tube, the structure of the aperture or elongated receiver 210 may have an arcuate inner face, with a radius that at least approximately matches the radius of the specimen container 100.

Figure 6A:
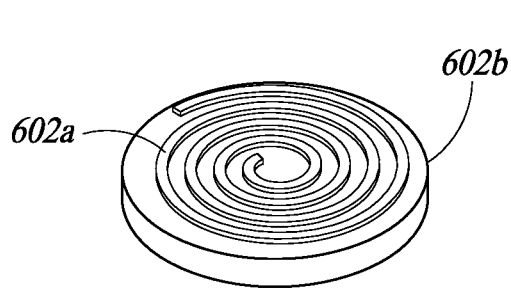
FIG. 6A is an isometric view of a printed circuit board carrying an antenna of the interrogation device or system of FIG. 5A and an optional imager, according to at least one illustrated implementation.

FIG. 6A shows an interrogation antenna 600*a* carried by a printed circuit board 602*a* carrying, according to at least one illustrated implementation. The interrogation antenna 600*a* may be employed in any of the various systems or tools described herein. For example, the interrogation antenna 600*a* may be employed in the hand-held pistol-shaped body 202*a* of FIG. 5A, for instance positioned behind the stop or end wall 502.

As illustrated, the interrogation antenna 600*a* may take the form of a spiral antenna, although the particular illustrated shape of the interrogation antenna 600*a* is not intended to be limiting unless explicitly claimed as such. The interrogation antenna 600*a* may be formed as an electrically conductive trace or pattern on one or more exterior surfaces of the printed circuit board 602*a* and/or one or more inner layers of the printed circuit board 511, and may employ one or more vias that provide electrically conductive paths between the exterior surfaces and/or one or more inner layers of the printed circuit board 602*a*. Various structures and techniques for the interrogation antenna 600*a* may be employed, typically dependent on the geometry of the RFID transponder and associated antenna thereof.

Figure 6B:
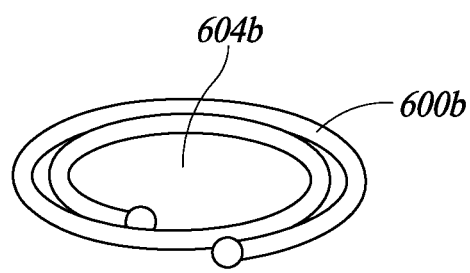
FIG. 6B is an isometric view of an antenna of the interrogation device or system of FIG. 5B, according to at least one illustrated implementation.

FIG. 6B shows an interrogation antenna 600*b*, according to at least one illustrated implementation. The interrogation antenna 600*b* may be employed in any of the various systems or tools described herein. For example, the interrogation antenna 600*b* may be employed in the hand-held pistol-shaped body 202*b* of FIG. 5B or hand-held wand-shaped body 202*d* (FIGS. 5D-5G), for instance positioned at or proximate a distal-most portion of the aperture or elongated receiver 210.

As illustrated, the interrogation antenna 600*b* may take the form of one or more loops, for example open loops or closed loops, although the particular illustrated shape of the interrogation antenna 600*b* is not intended to be limiting unless explicitly claimed as such. The interrogation antenna 600*b* may be formed as an electrically conductive trace or pattern on one or more exterior surfaces of the aperture or elongated receiver 210 and/or one or more inner layers of the aperture or elongated receiver 210 and may employ one or more vias that provide electrically conductive paths between the exterior surfaces and/or one or more inner layers of the aperture or elongated receiver 210. As such, the interrogation antenna 600*b* will typically have a central passage 604*b* that has a lateral (e.g., radial) dimension sufficient large as to accommodate a portion of a specimen container 100 therethrough. Various structures and techniques for the interrogation antenna 600*b* may be employed, typically dependent on the geometry of the RFID transponder and associated antenna thereof. One or more electrically conductive paths (e.g., wires, sheathed wires) may communicatively couple the interrogation antenna 600*b* to interrogation circuitry, for example the circuitry 506.

FIG. 7 shows a system in the form of an end of arm tool or end effector 700, according to at least one illustrated implementation.

The end of arm tool or end effector 700 may include a body 702 which may comprise or have fixed thereto at least one coupler 704. The at least one coupler 704 detachably couples the body 702 to an appendage 706 of a robot 708. The at least one coupler 704 may, for example, physically or magnetically coupled to a complementary coupler or complementary couplers 710 on the appendage 706. The coupler(s) 704 may take any of a variety of forms, for example, an internal or external thread to form a screw mount coupler, tabs or prongs or recesses to from a bayonet mount coupler; springs (e.g., leaf springs, coil springs) or spring biased balls, pins or bearings to form a quick-release mount coupler (e.g., one or more spring biased balls position to be received in a channel or recess, for instance an annular channel); and/or permanent magnets and/or ferrous metal pieces to form a magnetic mount coupler.

As also illustrated in FIG. 7, the end of arm tool or end effector 700 may be particularly useful in performing pick and place operations. For example, the end of arm tool or end effector 700 may be employed to pick a particular tubular specimen container 100*a* from a group or set of a plurality of tubular specimen containers 100*a*, 100*b*-100*n* (only three total tubular specimen containers called out). The plurality of tubular specimen containers 100*a*, 100*b*-100*n* may for example, be arranged in an array 712, for example in an array of openings 714 (only one called out) of a tray or carrier 716. The tubular specimen containers 100*a*, 100*b*-100*n* may, for example, be arranged in an array 712 with a defined spacing D between outmost portions of nearest neighboring ones of the tubular specimen containers 100*a*, 100*b*-100*n* and/or openings 714. The body 702 may have an outer lateral dimension W that provides a defined clearance with all neighboring ones of the tubular specimen containers 100*a*, 100*b*-100*n* when the end of arm tool or end effector 700 is positioned such that any one of the tubular specimen containers 100*a* is positioned in aperture or elongated receiver 210 of the body 702 of the end of arm tool or end effector 700. The amount of clearance may take into account a defined tolerance in movement or position of the end of arm tool or end effector 700 at the end of the appendage 706.

The end of arm tool or end effector 700 (FIG. 7), hand-held pistol-shaped body 202*a* (FIGS. 2-5A), 202*b* (FIG. 5B), body 202*c* (FIG. 5C), and/or hand-held wand-shaped body 202*d* (FIGS. 5D-5H) may include one or more retainers to detachable retain a tubular specimen container 100 (FIG. 1) in the aperture or elongated receiver 210 as the end of arm tool or end effector 700, hand-held pistol-shaped body 202*a*, 202*b*, body 202*c*, and/or hand-held wand-shaped body 202*d* moves.

Figure 8A:
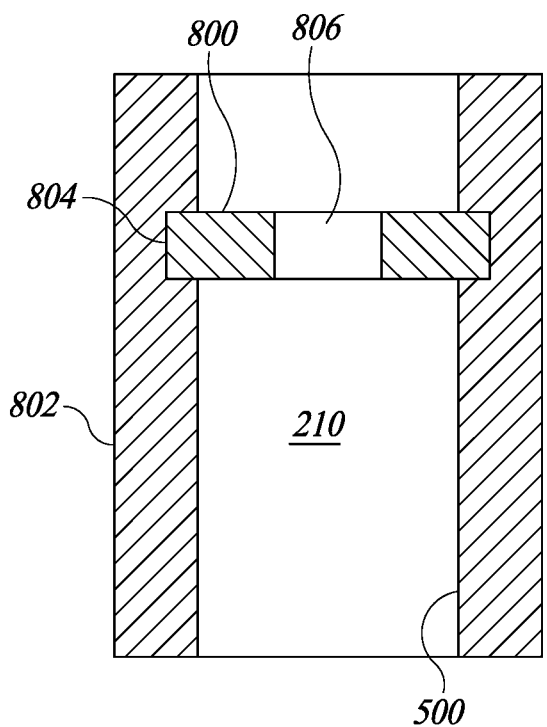
FIG. 8A is cross-sectional view of a portion of an interrogation device or system according to at least one illustrated implementation, showing a retainer in the form of at least one resilient retainment member positioned in an aperture or elongated receiver to detachably retain a tubular specimen containers therein.
Figure 8B:
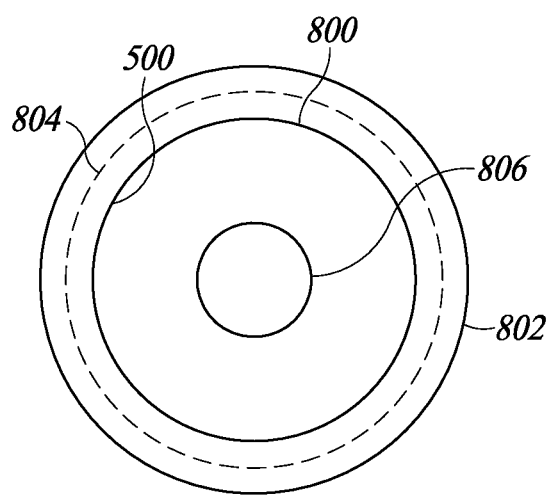
FIG. 8B is a distal end plan view of the portion of the interrogation device or system of FIG. 8B.

FIGS. 8A and 8B show a retainer in the form of one or more resilient retainment members 800, that are part of or attached to a body 802 of an interrogation system or device, for example an end of arm tool or end effector 700 (FIG. 7), hand-held pistol-shaped body 202*a* (FIGS. 2-5A), 202*b* (FIG. 5B), body 202*c* (FIG. 5*c*), and/or hand-held wand-shaped body 202*d* (FIGS. 5D-5G). The resilient retainment member(s) 800 securingly receives a portion of a tubular specimen container 100 (FIG. 1), The resilient retainment member(s) 800 may, for instance, comprise or consist of one or more pieces of a resilient material. The resilient retainment member(s) 800 may, for example, extend inwardly into the aperture or elongated receiver 210. The resilient retainment member(s) 800 may, for example, be embedded or other attached to the inner wall 500. For instance, a portion of the resilient retainment member(s) 800 may be secured in a channel 804 in the inner wall 500. For example, the resilient retainment member(s) 800 may have a dimension that causes the resilient retainment member(s) 800 to be compressed or otherwise deformed by the channel, the resilient retainment member(s) 800 physically held in place in the channel 804 via a restorative force that opposes compression. Additionally or alternatively, the resilient retainment member(s) 800 and/or the channel 804 may have one or more securement features for instance, lips or lugs that engage to physically hold the resilient retainment member(s) 800 in place in the channel. The structure(s) or approached employed takes into account any anticipated changes in dimension of the various structures due to exposure to cold temperatures (e.g., ultra-cold; cryogenic).

The resilient retainment member(s) 800 may include or form an opening 806. The opening 806 is sized to receive a portion of a cap or a feature (e.g., knob, lug, handle) that is part of the cap. The opening 806 is preferably slightly smaller than a largest part of the portion or feature of the tubular specimen container 100 to be gripped, for instance smaller than a width of a portion or feature of the cap of the tubular specimen container 100. Thus, the resilient retainment member(s) 800 may, for example deform as the largest part of the portion or feature is received through the opening 806. The resilient retainment member(s) 800 may be elastically deformable as the largest part of the portion or feature of the tubular specimen container 100 pass therethrough, returning to an undeformed state or less deformed state after the largest part of the portion or feature of the tubular specimen container 100 to be gripped passes through the opening 806. The tubular specimen container 100 can be released from the resilient retainment member(s) 800 by apply a force in an opposite direction (e.g., pulling) as a direction of the force applied to insert into the opening.

The resilient retainment member(s) 800 may, for example, take the form of one or more pieces of resilient material, for instance plastic or rubber. The resilient retainment member(s) 800 may, for instance, take the form of a plate or substrate or an annulus or gasket of plastic or of a rubber with a through-hole extending therethrough. The resilient retainment member(s) 800 may, for instance, take the form of a plurality of leaflets or cusps of plastic or rubber particularly ones that will reliable pliable and resilient at cryogenic temperatures.

Figure 9:
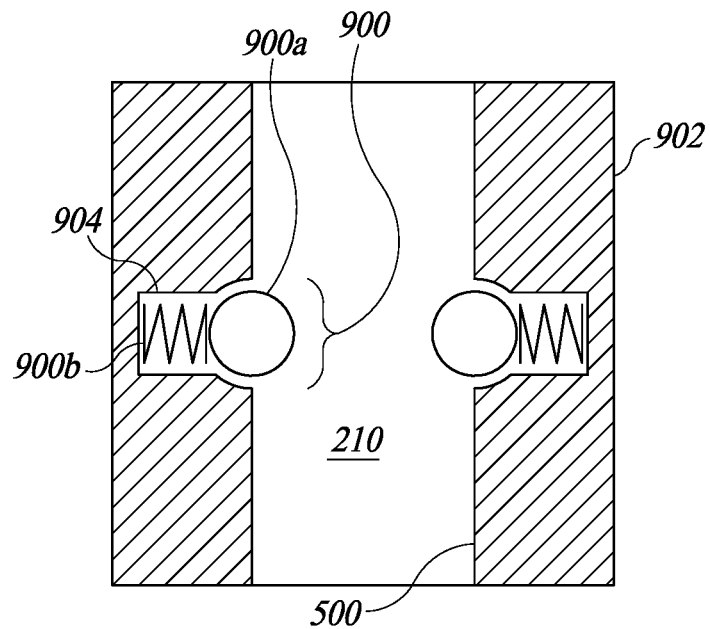
FIG. 9 is cross-sectional view of a portion of an interrogation device or system according to at least one illustrated implementation, showing a retainer in the form of one or more detents that include spring biased balls, pins or bearings.

FIG. 9 shows a retainer in the form of one or more detents 900, that are part of or attached to a body 902 of an interrogation system or device, for example an end of arm tool or end effector 700 (FIG. 7), hand-held pistol-shaped body 202a, 202b, 202c (FIGS. 2-5B), or wand-shaped body 202d (FIGS. 5D-5G). The detent(s) securingly receives a portion of a tubular specimen container 100 (FIG. 1).

The detent(s) 900 may be located in the aperture or elongated receiver 210 to physically engage a portion of a tubular specimen container 100, for example to receive a portion of a cap or a feature (e.g., knob, lug, handle) that is part of the cap. While the detents 900 may take any of a large variety of forms, in the illustrated embodiment the detents 900 take the form one or more ball, pins or bearings 900a (only one called out) which are biased by springs 900b (only one called out) inwardly toward a longitudinal axis of the aperture or elongated receiver 210. The springs 900b may take any of a large variety of forms, for example, coil springs or leaf springs. Thus, the ball, pins or bearings 900a apply an inward bias force against the portion of a tubular specimen container 100 when the tubular specimen container 100 is received in the aperture or elongated receiver 210 at a sufficient depth along the longitudinal axis. The ball, pins or bearings 900a and/or springs 900b may be retained by a retainment channel or recesses 904 formed in the inner wall 500. The structure(s) or approached employed takes into account any anticipated changes in dimension of the various structures due to exposure to cold temperatures (e.g., ultra-cold; cryogenic).

The detents 900 may be positioned to assure that the tubular specimen container 100 is correctly positioned at some defined distance and/or orientation, at least along the longitudinal axis, with respect to some other component, for instance the interrogation antenna or a sensor.

Figure 10:
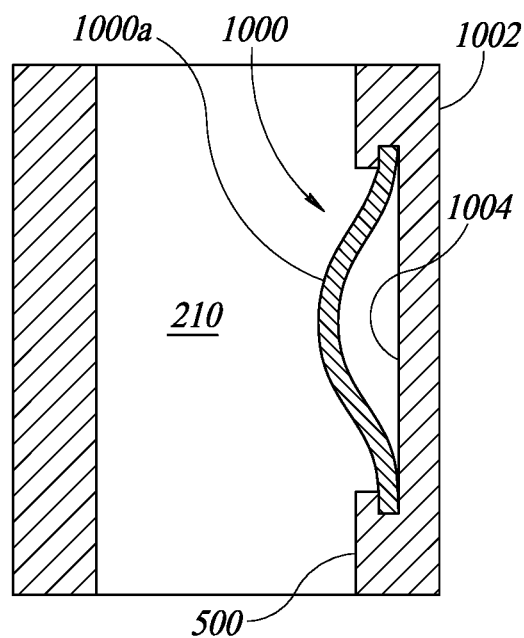
FIG. 10 is cross-sectional view of a portion of an interrogation device or system according to at least one illustrated implementation, showing a retainer in the form of one or more detents that include a leaf spring.

FIG. 10 shows a retainer in the form of one or more detents 1000, that are part of or attached to a body 1002 of an interrogation system or device, for example an end of arm tool or end effector 700 (FIG. 7) or hand-held pistol-shaped body 202a, 202b, 202c (FIGS. 2-5B), or wand-shaped body 202d (FIGS. 5D-5G). The detent(s) 1000 securingly receives a portion of a tubular specimen container 100 (FIG. 1).

The detent(s) 1000 may be located in the aperture or elongated receiver 210 to physically engage a portion of a tubular specimen container 100, for example to receive a portion of a cap or a feature (e.g., knob, lug, handle) that is part of the cap. While the detent(s) 1000 may take any of a large variety of forms, in the illustrated embodiment the detent(s) 1000 take the form one or more leaf springs 1000a (only one illustrated) which applies a bias force inwardly toward a longitudinal axis of the aperture or elongated receiver 210. Thus, the leaf spring(s) 1000a applies(apply) an inward bias force against the portion of a tubular specimen container 100 when the tubular specimen container 100 is received in the aperture or elongated receiver 210 at a sufficient depth along the longitudinal axis. The detents 1000 may be positioned to assure that the tubular specimen container 100 is correctly positioned at some defined distance and/or orientation with respect to some other component, for instance the interrogation antenna or a sensor. The leaf spring(s) 1000a may be retained by a retainment channel or recesses 1004 formed in the inner wall 500, either under compression and/or via one or more securement features (e.g. lips, lugs, fingers). The structure(s) or approached employed takes into account any anticipated changes in dimension of the various structures due to exposure to cold temperatures (e.g., ultra-cold; cryogenic).

While not illustrated, a retainer may take the form of one or more permanent magnets that are part of or attached to a body of an interrogation system or device, for example an end of arm tool or end effector 700 (FIG. 7), hand-held pistol-shaped body 202a, 202b, 202c (FIGS. 2-5B), or wand-shaped body 202d (FIGS. 5D-5G). The permanent magnet(s) securingly magnetically attracts a portion of a tubular specimen container 100 (FIG. 1).

For example, the permanent magnet(s) may magnetically attract a cap of the tubular specimen container 100 where the cap, a portion thereof, or an attachment there to is a ferrous metal or includes another permanent magnet oriented with opposite polarity as the permanent magnet on the end of arm tool or end effector 700 or hand-held wand 202a, 202b, 202c, 202d.

The permanent magnet end of the arm tool or end effector 700 or hand-held wand 202a, 202b, 202c, 202d preferably has sufficient force to attract at least a portion of the tubular specimen container 100 (FIG. 1), for instance a cap, or a feature of the cap, when the tubular specimen container 100 is positioned in the aperture or elongated receiver. The permanent magnet(s) preferably does not appreciable attract tubular specimen containers 100 that are outside the aperture or elongated receiver 210, and may include a magnetic shield spaced laterally or radially outward of the permanent magnet to prevent such attraction.

The permanent magnet(s) is(are) preferably spaced from the interrogation antenna by a sufficient distance and/or materials such that the magnetic field of the permanent magnet has a negligible, de minimis or no effect on the interrogation antenna. One or more magnetic shields may be positioned between the permanent magnet and the interrogation antenna.

While not illustrated, a retainer may take the form of one or more electromagnets that are part of or attached to a body of an interrogation system or device, for example an end of arm tool or end effector 700 (FIG. 7), hand-held pistol-shaped body 202a, 202b, 202c (FIGS. 2-5B), or wand-shaped body 202d (FIGS. 5D-5G). The electromagnet(s) securingly magnetically attracts a portion of a tubular specimen container 100 (FIG. 1).

For example, the electromagnet(s) may magnetically attract a cap of the tubular specimen container 100 where the cap, a portion thereof, or an attachment there to is a ferrous metal or includes another electromagnet oriented with opposite polarity as the electromagnet on the end of arm tool or end effector 700 or hand-held wand 202a, 202b, 202c, 202d. The electromagnet may include a ferrite core and electrically conductive windings wrapped around the ferrite core. The electrically conductive windings may be coupled to a voltage source (e.g., battery), via one or more switches. The switch(es) may be controlled by a processor operated to cause the electromagnet to induce a magnetic field to attract and alternatingly cease the magnetic field to release the tubular specimen container 100.

The electromagnet of the end of the arm tool or end effector 700 or hand-held pistol-shaped body 202a, 202b, 202c, or hand-held wand shaped body 202d preferably has sufficient magnetic force to attract at least a portion of the tubular specimen container 100 (FIG. 1), for instance a cap, or a feature of the cap, when the tubular specimen container 100 is positioned in the aperture or elongated receiver. The electromagnet(s) preferably does not appreciable attract tubular specimen containers 100 that are outside the aperture or elongated receiver 210, and may include a magnetic shield spaced laterally or radially outward of the electromagnet to prevent such attraction.

The electromagnet(s) is(are) preferably spaced from the interrogation antenna by a sufficient distance and/or materials such that the magnetic field of the electromagnet has a negligible, de minimis or no effect on the interrogation antenna. One or more magnetic shields may be positioned between the electromagnet and the interrogation antenna.

Figure 11:
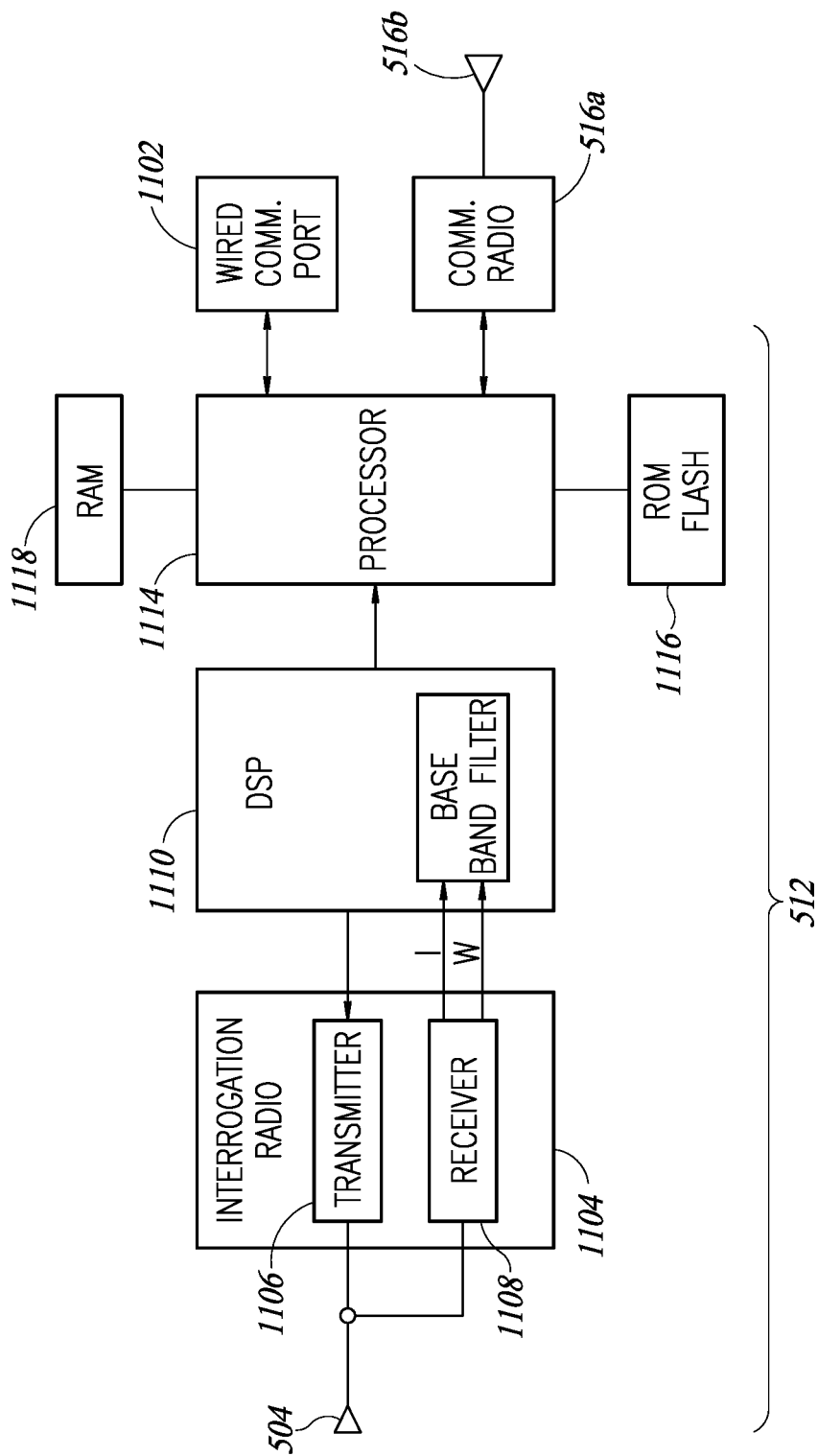
FIG. 11 is a schematic diagram of a set of circuitry of the interrogation device or system, according to at least one illustrated implementation.

FIG. 11 shows a set of circuitry 506 of the interrogation device or system 200 (FIGS. 2-4), 200a (FIG. 5A), 200b (FIG. 5B), 200c (FIG. 5C) and/or 200d (FIGS. 5D through 5G), according to at least one illustrated implementation.

The circuitry 506 includes an interrogation circuit 512, communications radio 516a, associated communications antenna 516b, and an optional wired communications port 1102. The communications radio 516a and associated communications antenna 516b can take any of a variety of forms used to provide wireless communications, for instance via Bluetooth protocol or a cellular protocol, etc. The wired communications port 1102 can take any of a variety of forms used to provide wired communications, for example serial or parallel communications ports, USB-A, USB-B or USB-C communications ports, etc.

An exemplary interrogation circuit 512 is illustrated although other interrogation circuits can be employed. The interrogation circuit 512 may be operable to interrogate and receive responses from passive wireless transponders, for example passive RFID transponders that derive power from interrogation signals. In some implementations, the interrogation circuit 512 may to interrogate and receive responses from active wireless transponders, for example active RFID transponders with a chemical battery as a power source.

The interrogation circuit 512 either includes, or is communicatively coupled to, one or more interrogation antenna 504. The interrogation circuit 512 includes an interrogation radio 1104, which includes a transmitter section 1106 and a receiver section 1108. The transmitter section 1106 transmits interrogation signals via the interrogation antenna 504, for example to optionally power a wireless transponder, and to cause a wireless transponder to wirelessly respond with identification information. The receiver section 1108 receives response signals from via the interrogation antenna 504. The transmitter section 1106 and/or receiver section 1108 can employ commercially available RFID interrogation circuitry and techniques. While illustrated as a single interrogation antenna 504, in some implementations separate interrogation antennas 504 may be employed by the transmitter and the receiver sections 1106, 1108.

The interrogation circuit 512 may include a processor, for example a digital signal processor (DSP) 1110 or field programmable gate array (FPGA) coupled to control the transmitter section 1106 and to receive signals (e.g., I/Q signals) from the receiver section 1108. The DSP 1110 may perform preprocessing on the received signals (e.g., I/Q signals) to extract information (e.g., unique identifier) from the received signals, for example including a baseband filter 1112 to filter a baseband from the received signals.

The interrogation circuit 512 may include a processor, for example a microprocessor 1114 with one or more central processing units or cores, an application specific integrated circuit (ASIC) coupled to the DSP 1110. The interrogation circuit 512 may also include nontransitory processor-readable storage media, for example nonvolatile memory such as read only memory (ROM) and/or FLASH 1116 and/or volatile memory such as random access memory (RAM) 1118. The ROM/FLASH 1116 and RAM 1118 are communicatively coupled to the microprocessor 1114 via one or more communications channels, for example a power bus, instruction bus, address bus, etc. The microprocessor 1114 executes logic, for example logic stored in the nontransitory processor-readable media (e.g., FLASH 1116, RAM 1118) as one or more sets of processor-executable instructions and/or data. The microprocessor 1114 may also be communicatively coupled to the communications radio 516a and/or wired communications port 1102 to provide information and data to external systems and/or to receive instructions therefrom.

The interrogation circuit 512 may include one or more mixers, filters, amplifier analog-to-digital converters and/or other electrical and electronic components operable to cause transmission of interrogation signals and processing of return signals, for example components employed in RFID interrogators.

While not illustrated, the interrogation device or system 200, and in particular the hand-held pistol-shaped body 202a, 202b, 202c (FIGS. 2-5B) or wand-shaped body 202d (FIGS. 5D-5G) may include one or more user interface (UI) components, for example one or more switches, triggers, display screens, speakers, graphical user interfaces (GUIs) with user-selectable icons. The UI components allow a user to control the operation of the interrogation device or system 200 and, optionally to receive information therefrom. For example, after positioning a specimen container 100 (FIGS. 1, 3, and 4) in the aperture or elongated receiver 210 of the hand-held pistol-shaped body 202 *a*, 202*b*, 202*c* (FIGS. 2-5B) or wand-shaped body 202*d* (FIGS. 5D-5G), the user may press a button, key or trigger to cause the interrogation circuit 512 to transmit an interrogation signal and to receive and process response signals to extract information (e.g., unique identifier) therefrom. While the above is described with respect to manual operation, in some implementations the interrogation device or system may include one or more sensors that detect when a specimen container 100 is correctly positioned in the aperture or elongated receiver, and in response triggers the interrogation. While the above is described with respect to manual operation, in some implementations the interrogation device or system may take the form of an end of arm tool or end effector 700 (FIG. 7) mounted to, or part of, a robotic appendage 706, and the positioning and triggering may be fully automated (i.e., performed autonomously by a robot 708), for example as part of a pick and place operation.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various implementations described above can be combined to provide further implementations. To the extent that they are not inconsistent with the specific teachings and definitions herein, all of the U.S. patents, U.S. patent application publications, U.S. patent applications, foreign patents, foreign patent applications and non-patent publications referred to in this specification, including: U.S. Application Ser. No. 63/087,000; U.S. Application Ser. No. 63/109,533; U.S. Application Ser. No. 63/087,000; U.S. application Ser. No. 16/593,062, now published as US2020-0107541; U.S. Application Ser. No. 62/927,566; U.S. Application Ser. No. 62/936,133; U.S. Application Ser. No. 63/026,526; U.S. application Ser. No. 29/748,815; and International (PCT) Application Serial No. PCT/US2019/054722, are incorporated herein by reference, in their entirety. Aspects of the implementations can be modified, if necessary, to employ systems, circuits and concepts of the various patents, applications and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A system to read information from wireless transponders carried by or in tubular specimen containers, the system comprising:

a body having a proximate end, a distal end, and an aperture at the distal end, the aperture having an opening at an outermost portion thereof, and a stop located rearwardly from an outermost opening of the aperture, relatively toward the proximate end, the aperture including structure sized to receive a portion of a tubular specimen container therein, and the stop sized and positioned to limit a distance that the tubular specimen container may be inserted into the aperture; and an interrogation antenna carried by a portion of the body, the interrogation antenna positioned to communicatively couple with a wireless transponder carried by the tubular specimen container at least when the tubular specimen container is positioned in the aperture, wherein the stop is located to distance the interrogation antenna from the wireless transponder carried by the tubular specimen container when the portion of the tubular specimen container is positioned in the structure of the aperture of the body, and wherein the interrogation antenna is positioned forwardly of the stop, relatively toward the distal end.

2. The system of claim 1, further comprising: an interrogation circuit communicatively coupled to the interrogation antenna.

3. The system of claim 1 wherein the structure of the aperture is an inner wall with a profile that matches a profile of an outer portion of the tubular specimen container.

4. The system of claim 1 wherein the structure of the aperture is a plurality of ribs with a profile that matches a profile of an outer portion of the tubular specimen container.

5. The system of claim 1 wherein the tubular specimen container comprises a vial and a cap that is selectively removable from the vial, and the structure of the aperture has a profile that matches a profile of an outer portion of the vial with the cap removed.

6. The system of claim 1 wherein the structure of the aperture has a profile that has at least one dimension that is sized with respect to a corresponding at least one dimension of an outer portion of the tubular specimen container such that the outer portion of the tubular specimen container contacts the structure of the aperture around an entirety of the profile of the structure while permitting at least one of sliding or rotation therebetween.

7. The system of claim 1 wherein the stop provides a terminus to the structure sized to receive the portion of the tubular specimen container therein and distances the interrogation antenna from the wireless transponder carried by the tubular specimen container by an integer multiple of a wavelength of the wireless transponder.

8. The system of claim 1 wherein the wireless transponder is physically coupled to a specimen straw carried by the specimen container, and wherein the stop provides a terminus to the structure sized to receive the portion of the tubular specimen container therein and distances the interrogation antenna from the wireless transponder by an integer multiple of a wavelength of the wireless transponder.

9. The system of claim 8 wherein the structure of the aperture has a profile that has at least one dimension that is sized with respect to a corresponding at least one dimension of an outer portion of the tubular specimen container such that the outer portion of the tubular specimen container contacts the structure of the aperture around an entirety of the profile of the structure while permitting at least one of sliding or rotation therebetween.

10. The system of claim 1 wherein the structure of the aperture is sized to closely receive the tubular specimen container and positioned relative to the interrogation antenna to position the wireless transponder carried by the tubular specimen container at a defined location in an X-Y plane relative to the interrogation antenna when the tubular specimen container is positioned in the aperture, and the stop is positioned relative to the interrogation antenna to position the wireless transponder at a defined location along a Z axis when the tubular specimen container is positioned in the aperture with a top end thereof positioned against the stop, wherein the Z axis is perpendicular to the X-Y plane.

11. The system of claim 1 wherein at least a portion of the body includes a shield that is positioned to radially encompass at least a portion of the aperture, the shield providing a shield to at least one of radio frequency or microwave frequency communications.

12. The system of claim 11 wherein at least a portion of the body includes a spacer that spaces the shield radially outward from the aperture.

* * * * *